US007591423B2

(12) United States Patent
Hallbauer et al.

(10) Patent No.: US 7,591,423 B2
(45) Date of Patent: Sep. 22, 2009

(54) SALES AID

(75) Inventors: Holm Hallbauer, Dresden (DE); Mark Hallbauer, Dresden (DE)

(73) Assignee: Studio Innovators International, Cyberjaya (MY)

( * ) Notice: Subject to any disclaimer, the term of this patent is extended or adjusted under 35 U.S.C. 154(b) by 448 days.

(21) Appl. No.: 11/341,883

(22) Filed: Jan. 27, 2006

(65) Prior Publication Data

US 2007/0040036 A1 Feb. 22, 2007

(30) Foreign Application Priority Data

Aug. 16, 2005 (DE) ........................ 10 2005 038 659
Aug. 23, 2005 (DE) .................... 20 2005 013 307 U
Sep. 19, 2005 (DE) ........................ 10 2005 044 642
Oct. 20, 2005 (DE) ........................ 10 2005 050 354
Nov. 15, 2005 (DE) ........................ 10 2005 054 406

(51) Int. Cl.
*G06K 15/00* (2006.01)

(52) U.S. Cl. ......................... 235/383; 235/487; 283/51; 283/106

(58) Field of Classification Search ................. 235/487, 235/383; 283/61, 106, 51
See application file for complete search history.

(56) References Cited

U.S. PATENT DOCUMENTS 1,572,341 A 2/1926 Willcox
4,496,171 A * 1/1985 Cherry ........................ 283/61
4,616,852 A 10/1986 Cash
4,991,767 A 2/1991 Wyant et al.
5,282,649 A 2/1994 Williams et al.
5,351,813 A 10/1994 Golovan et al.
5,661,506 A 8/1997 Lazzouni et al.
5,667,248 A 9/1997 Mayer et al.
6,206,428 B1 3/2001 Hansen et al.
6,354,985 B2 * 3/2002 Huber ........................ 493/458
6,752,427 B1 * 6/2004 Wilen .......................... 281/38
7,004,507 B2 * 2/2006 Shulman ..................... 283/106
2002/0090149 A1 7/2002 Ericson et al.
2006/0038396 A1 * 2/2006 Thompson et al. ............ 283/67

FOREIGN PATENT DOCUMENTS

DE 6807085 U 11/1969
DE 4032022 A1 4/1992

(Continued)

*Primary Examiner*—Ahshik Kim
(74) *Attorney, Agent, or Firm*—Knobbe Martens Olson & Bear, LLP

(57) ABSTRACT

The present invention relates to a sales aid in the form of a printed folded sheet, in particular a sales aid for print media or internet ads or the like. With the objective of providing a potential customer with an overview of the advantages and benefits the proffered services offer his company in the most efficient way possible in the shortest amount of time, the invention provides for the sales aid to comprise at least one supplemental sheet with supplemental information fields configured on its front and reverse sides and printed with predetermined supplemental information, wherein the supplemental sheet exhibits a lateral edge having at least one attachment section, and wherein the supplemental sheet is connected to the folded sheet by means of said attachment section such that said supplemental sheet can be folded open between a first position in which the reverse side of supplemental sheet is uncovered and a second position in which the front side of supplemental sheet is uncovered.

28 Claims, 10 Drawing Sheets

FOREIGN PATENT DOCUMENTS

| | | | |
|---|---|---|---|
| DE | 9209742 | U1 | 10/1992 |
| DE | 19947165 | A1 | 5/2001 |
| EP | 1543989 | A1 | 6/2005 |
| GB | 2215662 | A | 9/1989 |
| GB | 2322830 | A | 9/1998 |
| WO | WO 98/22293 | A1 | 5/1998 |
| WO | WO 99/12741 | A1 | 3/1999 |
| WO | WO 00/73887 | A | 12/2000 |
| WO | WO 01/31518 | A | 5/2001 |
| WO | WO 01/43981 | A | 6/2001 |
| WO | WO 01/75780 | A | 10/2001 |

* cited by examiner

Front side (101)

Reverse Side (10)

SALES AID

BACKGROUND OF THE INVENTION

1. Field of the Invention

The present invention relates to a sales aid in the form of a printed folded sheet and, in particular, to a sales aid for selling ads in printed media or on the internet, etc.

2. Description of the Related Art

When offering goods and services, in particular when selling ads in print media or on the internet, etc., it is necessary for the service provider, the salesperson respectively, to present an offer to a respective customer which is as ideally customized as possible. In this type of presentation, the intention is commonly not only to convince the (potential) customer of an offer, but also to find the best possible solution for the specific customer. By necessity, the solution customarily ends up being worked out in its final form during the actual conversation with the customer. This ultimately ensures a tailor-made offer being made to the customer in efficient fashion.

Yet to be taken into account when working out a customer-specific solution while meeting with a customer is that, on the one hand, the customer data crucial to the service provider or salesperson be available and transparent to both the service provider as well as the customer and, on the other hand, a customer-specific offer be developed in a manner which is clear and comprehensible to the customer. During such a meeting with a customer, it is often a case of, for example, convincing the customer that the proposed service generally promises economic success.

Yet it must also be considered that a salesperson or service provider only has a limited amount of time to present his or her ideas to the customer during such meetings. Given this short amount of time, it therefore becomes vital to convey ideas to the customer which are as optimized as possible.

In order to customize a service to a specific customer, customer-specific data is necessary such as the customer's volume of sales, the customer's market share, the number of employees the customer has, etc. Although this information is usually available to the salesperson prior to the customer meeting in the form of index cards, the salesperson is often uncertain whether the data in the file actually reflects the most current situation. Therefore, it is usually a case of reviewing the customer data with the customer at the beginning of each sales pitch. To ensure transparency between a salesperson and the customer, it then becomes necessary to present the customer data, for example on a printed sheet of paper.

It is furthermore necessary to briefly inform the customer about the advantages of the offered service or commodity at the beginning of the meeting. To this end, handouts or similar informational sheets are usually presented and then handed to the customer. Often during the course of a sales pitch, a salesperson will present an additional proposal (more or less already customized to the customer) which, for example, takes the salesperson's offered services into account. Here as well, such a proposal is usually made in the form of a handout prepared in advance by the salesperson and handed to the customer during the meeting. Using such a proposal as the basis, the actual customer-specific solution is then customarily worked out during the sales pitch.

Thus, generally speaking, a plurality of various different handouts serve as sales aids to present the advantages of offered services or goods during the course of a sales pitch. Another additional handout is moreover often used to inform a customer of a proposal in which the offered services or goods are already integrated. Furthermore, often a third handout is provided which contains the actual customer-specific solution worked out with the customer during the course of the sales meeting. Hence, all told, there are a number of handouts, informational sheets, etc., which are discussed during this type of sales meeting between a salesperson and a buyer.

The disadvantage to this conventional solution can especially be seen to be that of the buyer/customer often losing the overview of benefits and advantages to the offered services and goods over the course of the sales pitch. In other words, this means that the salesperson cannot present his service or commodity in an efficient manner. Also playing a large role is the only limited amount of time available for a sales pitch. Within this time frame, the salesperson has to present the advantages of his goods or service to the customer in as transparent a way as possible and, at the same time, work out the best possible solution for the customer.

SUMMARY OF THE INVENTION

Taking these requirements as a basis, the task which the present invention addresses is the further developing of a sales aid in the form of a printed folded sheet of the type specified at the outset which presents to a buyer an overview of the advantages and benefits of goods or services offered to the buyer's company as quickly and in the most efficient manner possible.

This task is solved in accordance with the invention by a sales aid in the form of a printed folded sheet in which: a) the front side and the reverse side of a folded sheet is printed with pre-determined information; b) the folded sheet exhibits a centrically-arranged foldable section extending longitudinally to the folded sheet and a centrically-arranged foldable section extending transversely to the folded sheet, wherein four information fields each are disposed on both the front side and the reverse side of said folded sheet; c) a pre-determined item of information is printed in each information field, whereby the reading direction for the front side and the reverse side of the folded sheet is in each case the same direction; and in which d) the sales aid has at least one supplemental sheet, the front and reverse side of which contains supplemental information fields printed with additional pre-defined information, whereby the at least one supplemental sheet is affixed to the folded sheet in such a manner than the supplemental sheet can be folded open between a first position, in which the reverse side of the supplemental sheet is uncovered, and a second position, in which the front side of the supplemental sheet is uncovered, wherein the at least one supplemental sheet exhibits a lateral edge having at least one attachment section and wherein the supplemental sheet is connected to the folded sheet via the attachment section in such a manner that the supplemental sheet can be folded open between a first position, in which the reverse side of the supplemental sheet is uncovered, and a second position, in which the front side of the supplemental sheet is uncovered.

BRIEF DESCRIPTION OF THE DRAWINGS

The following will make reference to the enclosed drawings in describing preferred embodiments of the present invention.

Shown are:

FIG. 2*b*—a view of the reverse side of the preferred embodiment of the sales aid according to the invention in fully unfolded state;

DETAILED DESCRIPTION

Figure 1A:
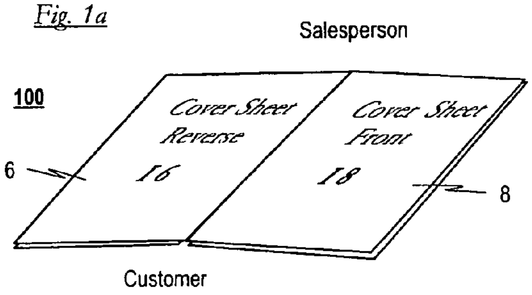
FIGS. 1*a-f*—the course of possible application of a preferred embodiment of the inventive sales aid in selling ads for a print medium.

The inventive solution has a plurality of substantial advantages over conventional layouts used during a sales pitch. Because a printed folded sheet is used as the sales aid, which due to a centrically-arranged foldable section extending longitudinally to the folded sheet, by means of, for example, a longitudinal fold, and due to a centrically-arranged foldable section extending transversely to the folded sheet, by means of, for example, a transverse fold, can be divided into a total of eight information fields, it is possible for the sales-person to strategically distribute the information crucial to his/her sales pitch into the individual information fields prior to the sales pitch. The further supplemental information fields provided on the at least one supplemental sheet expand the sales aid in terms of the amount of information prepared and available for the sale pitch. Distributing the information necessary to the sales pitch as strategically as possible among the individual information fields, supplemental information fields respectively, is particularly instrumental to the planned course of the customer/sales pitch. For example, it would make sense to place information relevant customer data (the customer profile) in the information fields or supplemental information fields which are uncovered at the beginning of the meeting. During the meeting, the folded sheet can then be unfolded or the at least one supplemental sheet can be folded open so that the salesperson and the buyer then have the suitably relevant information necessary to the further course of the meeting at hand.

On the other hand, the solution according to the invention dispenses with the need for preparing a plurality of individual handouts to give to the customer since the sales aid according to the invention contains all the pre-determined items of information crucial to the entire sales pitch on one (single) folded sheet, to which the at least one supplement sheet is additionally attached as an extension. The pre-determined items of information printed in each of the information fields or supplemental information fields concern, for example: information on the salesperson's company (service provider); information about the customer which can be, for example, reviewed and updated as needed during the course of the sales meeting; information on the status quo state; i.e., the status prior to making use of the offered service or purchasing the offered goods; a proposal detailing how this status quo state can be changed by the buyer purchasing the service or goods; as well as general information about the services or goods proposed during the sales pitch.

As mentioned above, it has previously been necessary to prepare a plurality of individual handouts and to present them during the meeting with the customer in order to use the information they contain to persuade the customer in favor of the offered product. The inventive solution does away with all that.

So that the inventive sales aid will not need to be turned during the sales pitch, assuming that the salesperson (service provider) and the buyer/customer are sitting across from one another, it is advantageously provided that each pre-determined item of information is printed on the folded sheet and the at least one supplemental sheet disposed on the folded sheet such that the reading direction is the same for the front side as the reverse side of the sales aid. Among other things, this has the result (given appropriate arrangement of the items of information in the individual information fields, supplemental information fields respectively) that the information crucial to the salesperson and the information crucial to the customer is in each case appropriately aligned to the reading direction of both the salesperson and that of the customer, when (as previously stated) the assumption is made that the salesperson and the customer are sitting across from one another, as is normally the case in such a sales meeting.

A further advantage to the sales aid according to the invention is seen in that the at least one supplemental sheet is connected to the folded sheet by means of an attachment section provided on a lateral edge of said supplemental sheet in such a manner than the supplemental sheet can be folded open between a first position, in which the reverse side of the supplemental sheet is uncovered, and a second position, in which the front side of the supplemental sheet is uncovered. In terms of the basic strategy underlying the sales pitch, which a salesperson has usually thought out to good extent beforehand, and with regard to the flexibility of the salesperson to uncover "new" information which is, for example, printed on the front side of the supplemental sheet, in light of certain situations arising during the sales pitch, this feature provides the salesperson with the ability to steer the sales pitch in the direction he/she wants. Being able to flip the supplemental sheet between the first and the second position thus enables additional information to be uncovered and presented to the buyer as the situation calls for during a sales pitch.

Advantageous embodiments of the invention are specified in the subclaims.

A first preferred embodiment of the inventive sales aid provides for the lateral edge of the supplemental sheet exhibiting the at least one attachment section to be disposed with a centrically-arranged folded section extending longitudinally to the folded sheet.

An advantageous realization of the first preferred embodiment further provides for the supplemental sheet disposed with the centrically-arranged folded section extending longitudinally to the folded sheet via the attachment section disposed on the lateral edge of said supplemental sheet being arranged such that an information field configured on the reverse or front side of the folded sheet can be at least partly covered by the supplemental sheet in the first position of said supplemental sheet, while the information field adjacent the information field in the first position of the supplemental sheet can be at least partly covered by the supplemental sheet in the second position of said supplemental sheet.

The advantage to the first embodiment of the inventive sales aid is obvious: by arranging the supplemental sheet with respect to the information fields configured on the folded sheet, it thus becomes possible to, for example, cover up an information field provided on the reverse or front side of the folded sheet with the supplemental sheet during a sales pitch and to present to the customer or potential buyer the additional information printed on the uncovered reverse side of the supplemental sheet. After same has been presented, the inventive embodiment allows for the supplemental sheet to be flipped into its second position, the result of this being that the additional information printed on the front side of the supplemental sheet is now uncovered and, as a consequence, the previously hidden information field of the folded sheet is simultaneously uncovered. These now uncovered information fields or supplemental information fields can be printed with the information intended to be presented to the customer at a later point in time during the sales pitch. This allows for, among other things, creating an element of surprise for the potential buyer, in particular the course of the sales pitch presentation can be strategically established beforehand so that the sale pitch can be steered in a specific direction.

In conjunction hereto, it would be conceivable for the format of the supplemental sheet to be, for example, identical to the format of the information field of the folded sheet hidden in the first position of the supplemental sheet so that when the supplemental sheet is folded open from the first position to the second position, the entire information field on the folded sheet is either covered or uncovered. Of course, it is just as conceivable here to format the supplemental sheet so as to be smaller such that the information fields configured on the folded sheet will only be partly covered accordingly.

A second equally advantageous development of the sales aid in accordance with the invention (second embodiment) provides for the lateral edge of the at least one supplemental sheet, disposed with the at least one attachment section, to be arranged along the centrically-arranged and transversely-extending foldable section of the folded sheet.

In a particularly preferred realization of this second embodiment of the inventive sales aid, it can be provided that the supplemental sheet be arranged lengthwise the centrically-arranged and foldable section extending transversely to the folded sheet via the attachment section provided at its lateral edge such that in the first position of said supplemental sheet, the supplemental sheet at least partly covers an information field configured on the reverse or front side of the folded sheet, while in the second position of said supplemental sheet, the information field lying below or above the information field which is hidden in the first position of the supplemental sheet is at least partly covered by said supplemental sheet. The same advantages cited in connection with the first preferred embodiment of the sales aid are also obtained here as well.

It is, however, pointed out here that the sales aid according to the invention may also comprise a plurality of supplemental sheets, whereby one such supplemental sheet in accordance with the first embodiment is thus arranged, for example, lengthwise the centrically-arranged and foldable section of the folded sheet which is disposed longitudinally to the folded sheet while another supplemental sheet in accordance with the second embodiment of the inventive sales aid is thus arranged along the centrically-arranged and foldable section of the folded sheet which is disposed transversely to the folded sheet.

A third preferred embodiment of the inventive sales aid provides for the lateral edge of the supplemental sheet exhibiting the at least one attachment section to be arranged on one of the information fields configured on the front side or the reverse side of the folded sheet parallel to the centrically-arranged and foldable section extending longitudinally to the folded sheet or parallel to the centrically-arranged and foldable section extending transversely to the folded sheet such that the supplemental sheet covers a first partial section of an information field configured on the front or the reverse side of the folded sheet in the first position of said supplemental sheet, while a second partial section of the one information field is covered by the supplemental sheet in the second position of said supplemental sheet. In this third preferred embodiment related to the arrangement of the lateral edge of the supplemental sheet exhibiting the at least one attachment section, the salesperson is given a particularly effective and, at the same time, easily realized tool in the sales aid, by means of which a sales pitch can be readily steered in line with a previously-established strategy and, in particular, without any special qualifications on the part of the salesperson.

That as stated in connection with the second embodiment with respect to the inventive device having a plurality of supplemental sheets also holds true here, whereby the individual supplemental sheets can each be arranged according to the cited preferred embodiment in terms of the orientation of the lateral edge of the supplemental sheet having the at least one attachment section to the folded sheet.

A fourth preferred embodiment provides for the lateral edge of the supplemental sheet having the at least one attachment section, to be arranged at least partially along an outer edge of the folded sheet. In a particularly preferred realization of the fourth embodiment, in which the supplemental sheet is arranged along an outer edge of the folded sheet by means of the attachment section provided on the lateral edge of the supplemental sheet, an information field configured on the reverse or the front side of the folded sheet is at least partly covered in the first position of the supplemental sheet while in the second position of the supplemental sheet, none of the information fields configured on the folded sheet are covered by the supplemental sheet. The advantages indicated in conjunction with the previously-mentioned embodiment are likewise attainable here. It is, of course, also conceivable for the inventive sales aid to exhibit a plurality of supplemental sheets, whereby each supplemental sheet is affixed to the folded sheet in accordance with one of the cited embodiments.

In an advantageous further development of the latter fourth embodiment, at least two supplemental sheets are provided, wherein the two outer edges of the folded sheet, at which the attachment sections of the two supplemental sheets are arranged at the respective lateral edge, lie opposite one another.

It would also be conceivable here to have the centrically-arranged foldable section extending between the two information fields configured on the front side or the reverse side of the folded sheet, with one of the two supplemental sheets arranged on its respective outer edge, be configured as a notching. This provides considerable advantages in terms of producing the sales aid in accordance with the invention. It is thus conceivable, for example, to produce the sales aid from three sheets of paper having the same format. For example, three sheets of paper of the DIN A2 format (16.5×23.3") are digitally pre-printed and pre-folded into, for example, the A4 format (approx. 8.5×11"). The information fields are thus configured on the individual sheets of paper in A4 format. It would be possible in this case to position two of the three sheets of paper adjacent one another longitudinally and connect them via the third sheet of paper longitudinally flanking the two sheets positioned together. Of course, other techniques to produce the sales aid are likewise conceivable here.

It is particularly preferred to configure the inventive sales aid in accordance with the previously-cited embodiments such that at least one of the information fields disposed on the folded sheet and/or at least one of the supplemental information fields of the at least one supplemental sheet is provided with a memo field containing printed items of information, whereby the reading direction for the items of information printed in the memo field is rotated 180° with respect to the reading direction of the front side and/or the reverse side of the folded sheet. This further development provides considerable advantages, particularly for the salesperson, since this feature facilitates the use of the sales aid. It is thus conceivable, for example, for the items of information printed in the memo field to serve the salesperson as a type of "cheat sheet;" i.e., printed with information which the salesperson can use to jog his/her memory during the sales pitch. For example, key words can be printed in the memo field which the salesperson has previously compiled with regard to the potential customer, in order for the salesperson to be ready at all times during the sales pitch with important customer-specific data which he/she can interject into the conversation and thus steer the sales pitch in the desired direction. Of course, any other information can also be printed here as well.

To the end that notes made by the salesperson during the meeting with the customer on the folded sheet, or on the at least one supplemental sheet respectively, can be recorded, a particularly preferred embodiment of the inventive sales aid calls for at least one of the information fields provided on the folded sheet and/or at least one of the information fields provided on a supplemental sheet to be configured as a recordable memo field. Important information can thus be entered, for instance handwritten, into this recordable memo field, which becomes of particular interest when developing a customer-specific solution during the sales pitch.

It would be further conceivable to detachably affix a carbonless transfer paper, a 3M "Action" paper in particular, to one of the information fields disposed on the folded sheet and/or to one of the supplemental information fields configured on the supplemental sheet.

In a particularly preferred realization of the latter embodiment, it is advantageously provided to configure the information field to which the transfer paper is detachably affixed as a recordable memo field.

Providing for such a carbonless transfer paper has the advantage that the customer-specific solution normally worked out at the end of a sales pitch is automatically furnished in duplicate, whereby one copy is intended, for-example, for the customer and one for the salesperson. Using a transfer paper does away with the need for photo-copying a jointly-developed solution, for example. This is then of particular advantage when the customer is to be given an identical working copy while, at the same time, the salesperson can keep such a working copy for further processing.

It is particularly preferred for the centrically-arranged foldable section extending longitudinally to the folded sheet and/or the centrically-arranged foldable section extending transversely to the folded sheet to be configured using a continuous strip of adhesive. This is of particularly technical advantage. Specifically, the adhesive strips should be configured such that they can be manually torn by hand; i.e., without needing to use scissors or other similar cutting tools, so that the function of the foldable section can be defeated as the need arises. For example, it would be conceivable at the end of a sales pitch to separate the folded sheet from the configured foldable section along the middle of the continuous adhesive strip, whereby one part of the sales aid remains with the customer while the salesperson takes the part for his/her files. Of course other realizations of the foldable section are just as conceivable. For example, the foldable section can also be configured with perforations.

Another advantageous embodiment provides for configuring the at least one attachment section, with which the supplemental sheet is affixed to the folded sheet, as a strip of adhesive or as a fold area. It is, of course, also conceivable here for the adhesive strip to be manually detachable or able to be torn by hand along its longitudinal orientation in order to provide the easiest possible separation of the supplemental sheet (when needed). From a technical standpoint, however, it makes sense to configure the attachment section as a fold area.

Because a printed folded sheet which can be divided by means of a centrically-arranged longitudinal fold and by means of a centrically-arranged transverse fold into a total of eight information fields is used as the sales aid, it becomes possible to strategically distribute the information crucial to a sales pitch into the individual information fields in advance. Moreover, additional information fields are available in the form of the insert sheet provided on an outer edge, in particular at an outer edge of one of the information fields of the folded sheet. Because the insert sheet, for example the supplemental sheet, is configured to be movable or foldable from a covering position, in which it at least partly covers an information field, into an opened position, in which the information field is uncovered, the information crucial to a sales pitch can be strategically distributed in an even more flexible way within the individual information fields. Distributing the information among the individual information fields is particularly instrumental to the planned course of the customer/sales pitch. For example, it would make sense to place information relevant customer data (the customer profile) in the information fields or supple-mental information fields which are uncovered at the beginning of the meeting. During the meeting, the folded sheet can then be flipped open so that the salesperson and the buyer then have the suitably relevant information necessary to the further course of the meeting at hand. In particular, the insert sheet can then be flipped open at a particularly advantageous point during the sales pitch to reveal the information field originally hidden by the insert sheet.

On the other hand, the solution according to the invention dispenses with the need for preparing a plurality of individual handouts to give to a customer, since the sales aid according to the invention contains all the pre-determined items of information crucial to the entire sales pitch on one (single) folded sheet. The pre-determined items of information printed in each of the information fields concern, for example: information on the salesperson's company (service provider); information about the customer which can be, for example, reviewed and updated as needed during the course of the sales meeting; information on the status quo state; i.e., the status prior to making use of the offered service or purchasing the offered goods; a proposal detailing how this status quo state can be changed by the buyer purchasing the services or goods; as well as general information about the services or goods offered during the sales pitch. As mentioned at the outset, it has previously been necessary to prepare a plurality of individual handouts and to present them during the meeting with the customer in order to use the information they contain to persuade the customer in favor of the offered product. The inventive solution does away with all that.

So that the inventive folded sheet will not need to be turned during the sales pitch, it is advantageously provided for each predetermined item of information to be printed such that the reading direction has the same orientation on the front side as on the reverse side. This has the result (given appropriate arrangement of the items of information in the individual information fields) that the information crucial to the salesperson and to the customer is in each case appropriately aligned to the reading direction of both the salesperson and that of the customer, assuming that the salesperson and the customer are sitting across from one another, as is the normal case in a sales meeting.

So that a customer-specific solution can be developed and outlined on the folded sheet during the sale pitch with the inventive sales aid, at least one insert sheet is advantageously disposed on a lateral edge, in particular an outer edge of one of the information fields of the folded sheet, such that the insert sheet is movable or flappable from a covering position in which it at least partly covers the one information field into an unfolded position in which the information field is then uncovered. One information field each is provided on the front side and the reverse side of the insert sheet in which the salesperson can work out the customer-specific solution during the course of the sales meeting. It is of course also conceivable to detachably affix a carbonless transfer paper, a 3M “Action” paper in particular, to one of the information fields disposed on the folded sheet or on the insert sheet, so that the customer-specific solution drafted within the information field during the sales pitch will then be available in duplicate, whereby one copy is intended, for example, for the customer and one for the salesperson. The transfer paper is in particular detachably affixed to the reverse side of the information field provided for recording the customer-specific solution. Using such a transfer paper in connection with the additional information fields made available by the at least one insert sheet dispenses with the need for photocopying a solution which has been developed jointly, for example.

With respect to the insert sheet, the front side and/or the reverse side of the at least one insert sheet is advantageously printed with predefined information, whereby the reading direction of the front side and the reverse side of the insert sheet corresponds in each case to the reading direction of the front side and the reverse side of the folded sheet. Selecting this reading direction for the predetermined information on the front and reverse side of the insert sheet does away with the need for the salesperson to have to turn the sales aid by 180° during the sales pitch because, in principle, the reading direction to the information fields on the folded sheet and the information fields on the insert sheet is correspondingly oriented to the buyer. It would be conceivable, for example, to display further marketing information on the front side or the reverse side of the insert sheet which is initially hidden in the covering position of the insert sheet, whereby when the insert sheet is moved into the unfolded position, the previously covered item of information printed in the information field is then uncovered. This item of information may be, for example, the draft of a revised and improved ad for a telephone directory so that the buyer is presented the revised presentation at the end of the sales pitch.

So that the insert sheet on which a customized solution has for example been drafted for the customer during the course of a sales meeting can be separated from the folded sheet after the meeting, it is advantageously provided for the at least one insert sheet to be detachably affixed to the lateral edge of an information field of the folded sheet, wherein a transverse fold is configured lengthwise the lateral edge of the one information field to which the at least one insert sheet is affixed. This transverse fold can be a strip of adhesive, in particular a unidirectionally-oriented adhesive strip.

As previously mentioned, it is moreover conceivable to detachably affix a carbonless transfer paper, a 3M “Action” paper in particular, to at least one of the information fields of the folded sheet and/or to at least one of the information fields of the at least one insert sheet. This thus occasions the customer-specific solution normally worked out at the end of a sales pitch being automatically furnished in duplicate, whereby one copy is intended for the customer or for the salesperson. The 3M “Action” paper is thereby affixed in detachable manner.

It is furthermore provided, for example, that at least two information fields of the total of eight information fields of the folded sheet are configured as memo fields in which notes can be recorded subsequently; i.e., during the sales pitch, whereby in each case one memo field in one information field of the front side of the folded sheet and one information field of the reverse side of the folded sheet is respectively configured such that they lie atop one another in the folded state of the folded sheet. Thus, near the end of the sales meeting; i.e., when the customer-specific solution is drafted, important information on same can be handwritten into the memo field on the reverse side of the folded sheet, whereby the transfer paper simultaneously transfers this information to the further memo field provided on the reverse side of the folded sheet.

Additionally or alternatively to the latter embodiment, it is further conceivable for the at least one information field of the at least one insert sheet to be configured as a memo field in which subsequent notations can be recorded.

Particularly preferred is for the memo fields to each exhibit transparent printed items of information. Such transparent printed items of information can serve as a basis for the developing of a customer-specific solution. However, to ensure that as much space as possible is available in the memo field for writing, the item of information is only printed transparently on the memo fields.

An advantageous further development of the latter embodiment provides for the transparently printed items of information on the at least two memo fields to be identical. The result of this is that the two memo fields, representing a duplicate copy of the customer-specific solution developed during conversation with the customer, are exactly identical. This is of particular advantage when the customer is to be given an identical working copy while, at the same time, the salesperson can keep such a working copy for further processing. Of course, it is also conceivable for the items of information printed in each memo field to differ from one another.

In a particularly preferable realization of the latter embodiment with respect to the transparently printed items of information in the memo fields, it is provided that the reading direction to the transparently printed items of information in the memo field have the same orientation on the front side of the folded sheet as the reading direction of the items of information printed in the other information fields on the front side of the folded sheet. Because a salesperson usually takes notes during a sales pitch, this has the advantage that the reading direction to the transparently printed items of information in the memo field is accordingly oriented to the buyer.

It is particularly preferable for the transfer paper to be affixed to the information field of the reverse side by means of an adhesive strip, whereby the outer edge of said transfer paper which abuts the outer edge of the longitudinal side of the folded sheet is affixed by means of a continuous adhesive strip, and whereby the edges of the transfer paper adjoining the outer edge of the transfer paper is affixed with a non-continuous adhesive strip. This thus allows the transfer paper on the information field of the reverse side to be easily detached from the folded sheet as the need arises. The adhesive strips are preferably configured so as to be reusable so that the transfer paper can be reaffixed to the reverse side of the folded sheet after having been detached.

In order to achieve a separation of the transfer paper also configured as a memo field which is as simple as possible, it is provided for the transfer paper to have notched areas at its outer edges which do not serve the affixing of the transfer paper to the information field of the reverse side of the folded sheet. These notched areas facilitate in the removing of the transfer paper from the folded sheet.

A further preferred embodiment provides for the transfer paper to be detachably affixed to the lower information field on the reverse side of the folded sheet in such a manner so as to form a pocket. This pocket can serve as needed to accommodate customer handouts which a customer gives to the salesperson during the course of the sales meeting. This thus does away with the need to keep such information such as customer business cards in a separate envelope. Storing this customer-provided information in the pocket formed by the transfer paper and the rear side of the folded sheet avoids any possible loss of this information.

It is additionally conceivable to provide a further memo field as needed in the form of a separate sheet between the transfer paper and the reverse side of the folded sheet. This becomes necessary when another service or another product is discussed during a sales pitch and possibly requested by the customer. It is conceivable here as well to provide a further transfer paper between the additional memo field (the separate sheet) and the reverse side of the folded sheet. This can in turn ensure that there are two versions of the solution drafted during the sales pitch available at the end of the sales pitch.

A particularly preferable realization of the invention of the inventive sales aid provides for the centrically-arranged transverse fold to be configured as a perforation. It is hereby possible for the folded sheet to be split along this perforation at the end of the sales pitch, whereby that part of the folded sheet containing the information fields which are of interest to the customer can be left with said customer.

A particularly preferred further development of the inventive sales aid provides for at least one information field of the folded sheet and/or the supplemental information fields of the at least one supplemental sheet, insert sheet respectively, to be configured as a memo field into which remarks can be entered subsequently, wherein a plurality of dots are printed on the memo field in a specific dot pattern such that the position of each dot represents an explicit coordinate on the memo field. Based on the sheet's dot matrix, the direction of reading is able to digitally detect and save the explicit coordinates of the information subsequently entered. In this way, an overall picture of the printed and then written pages can be generated.

A preferred realization provides for the entries subsequently inscribed in the memo field to be made using a recorder device, whereby a reader device is further provided in the recorder device which reads at least part of the transparent dot pattern printed on the memo field during the entering of the subsequent inscription in the memo field and recognizes the inscription entered on the basis of the dots as read. It is further conceivable for the recorder device to additionally comprise a communication device to digitally transmit to an external device the entered inscription detected on the basis of the dots as read. It is thus possible that data entered on the folded sheet during the sales pitch is, for example, automatically transmitted to the salesperson's publisher.

The advantageously-used "intelligent" recorder can in particular detect which side of the folded sheet is currently being written on and, in particular, what is being written on which part of the paper. To this end, the paper is provided with wholly specific background pixel information during printing. This background pixel information is expressed as a back-ground pattern of dots which the eye perceives as only a light gray background color.

At the end of a recording cycle, the information stored in the pen (handwritten notes, checked information boxes, arrows pointing to printed elements, etc.) can be transmitted to, for example, a cellular phone. This is either done by touching a special Send field on the paper or by pressing a send key on the pen. Other triggering mechanisms from pen to cell phone are also conceivable. Transmission to the cell phone can ensue via wired or wireless methods. Transmission via Bluetooth or infrared lends itself well. A call over the mobile communications network is initiated in the cell phone upon receipt and a special function of the telephone. After connecting to a computing center, the information received by the pen is transmitted from the cell phone to said computing center. An assignment is made in the computing center between the folded sheet, known to the database of the computing center, and the information received. In so doing, the information received can contain an identification of the folded sheet which is incorporated into the folded sheet with the background pixel information. This increases the wealth of information related to a customer/contact in the database. It is also possible to effect a new assignment of prototype classes and customer data. In addition, a new calculation could, for example, give rise to a new discount class or other new correlations important to a sales pitch which result in modified or customized customer offer options for the salesperson but which are not printed on the folded sheet.

In place of recording new customer information, the ad customer can directly engage the salesperson in conversation about his/her individual ad proposals. The customer could, for example, change the color design or font sizes or any other ad parameter by means of notes made by the salesperson with the pen. Any change which can be made on normal print sheets (printing proofs) is conceivable. Alternatively, the customer could simply accept the ad proposal outright.

All these actions comprise a written change to the original folded sheet. Incorporating these changes would normally require the salesperson to either give the flyer with the handwritten notes to another employee for further processing or to enter the changes directly into a computer system.

Since in this embodiment, the information is actually being fed back to the method and the method-realizing computer system as the sales meeting is still going on, reactions can be made accordingly fast—in real-time.

Based on the new information coming in from the cell phone and the mobile communications network, a new evaluation or a new order confirmation or a further alternative proposal can be made to the customer. In so doing, it would be additionally conceivable for an Editor to browse and assess the modified ad proposal, transmitted from the sales meeting to the computing center as described above, as to whether the modified ad proposal is feasible as such. This information from the computing center (e.g. new assignment of customer, new discount calculation, order confirmation, confirmation of ad changes, etc.) can then be automatically re-transmitted back through mobile communications network to cell phone of the salesperson holding the sales meeting with the customer. The information important to the salesperson is depicted on the display screen of the cell phone. Feasible transmission options are SMS, MMS, email (e.g. ASCII, HTML, XML) or other transmission protocols for structured and unstructured messages sent over mobile communications networks.

In this way, by making inscriptions on a piece of paper (folded sheet), the salesperson receives details, information and, as applicable, order confirmations during the sales pitch without human intervention. The salesperson could then print out just such an order confirmation on a portable printer from the information received from the cell phone such that he/she can immediately hand the customer the order confirmation.

A pen such as that from the Swedish firm Anoto can be used as the electronic pen. The above-described interactive function between the paper provided with the background pixel information and the electronic pen is known as Anoto functionality.

An advantageous embodiment of the sales aid according to the invention will be described in the following by making reference to an example. This example yields a service provider a customer presentation and a design of advertisements for printed media (for example, telephone directories). This example serves solely to illustrate the inventive sales aid and should in no way be construed as limiting. The sales aid is, of course, not only suited for offering services, but also for the offering of goods. The following representation of how information is distributed into the individual information fields of the folded sheet or the supplemental information fields of the supplemental sheet is also to serve only as an illustration.

Figure 2A:
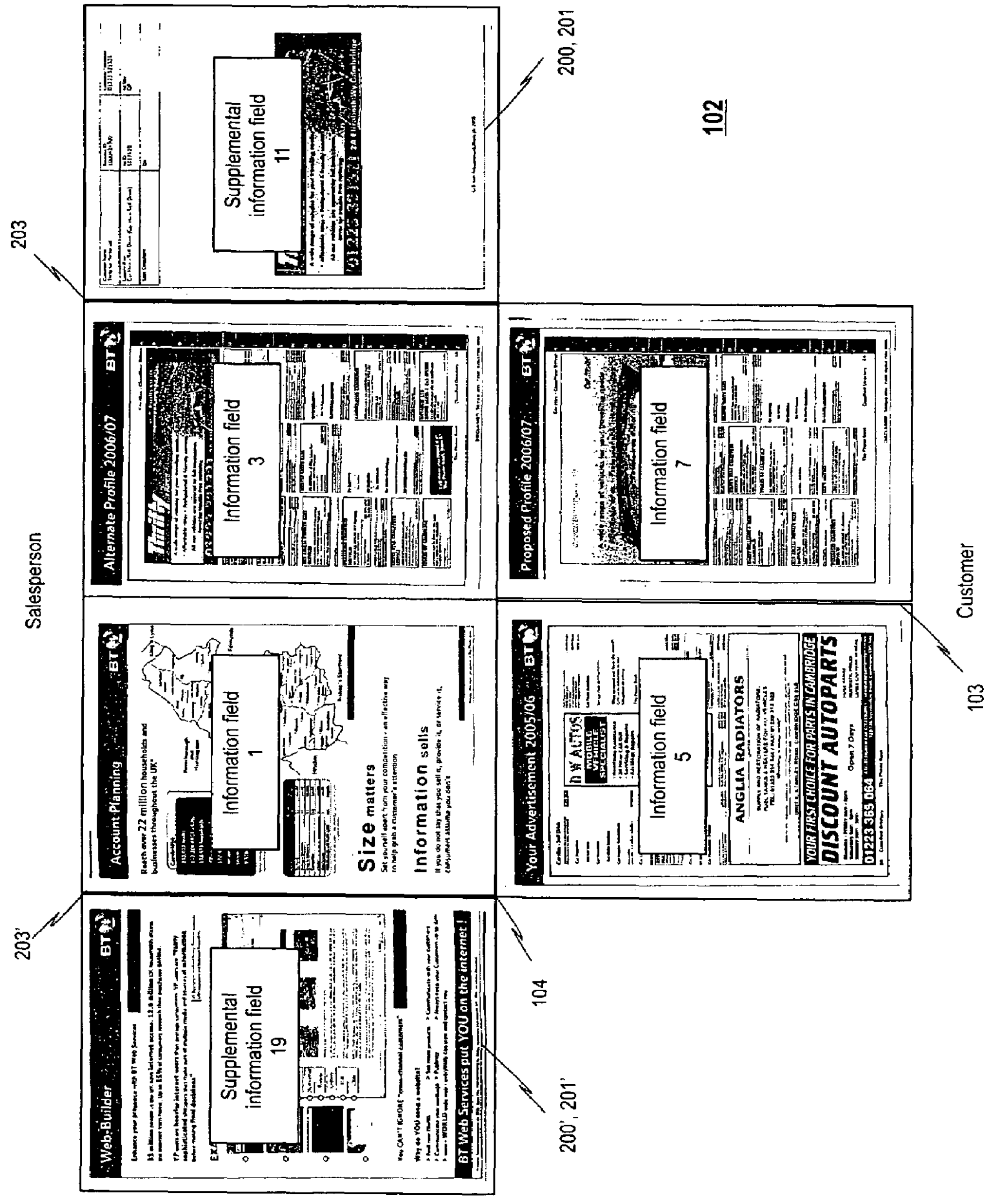
FIG. 2*a*—a view of the front side of the preferred embodiment of the sales aid according to the invention in fully unfolded state.

The sales aid in accordance with the invention is a printed folded sheet 100. The folded sheet 100 exhibits a centrically-arranged folded section 103 extending longitudinally to the folded sheet 100 and a centrically-arranged folded section 104 extending transversely to folded sheet 100, whereby four information fields 1 through 8 each are disposed on both the front side 101 and the reverse side 102 of folded sheet 100. Specific information I1 through I8 is printed in the respectively four different information fields 1, 3, 5, 7 and 2, 4, 6, 8 on the front side 101 and on the reverse side 102 (cf. FIGS. 2*a* and 2*b*). Some of these items of information are customer-specific information or also information on the service provider.

The special embodiment of the inventive sales aid in accordance with FIG. 1 and FIG. 2 moreover comprises two supplemental sheets 200, 200', configured with additional information fields 9 through 12 on their front side and reverse side and printed with pre-determined supplemental information I9 through I12. Here as well, some is customer-specific information or also information on the service provider. Supplemental sheets 200, 200' each exhibit a lateral edge having at least one attachment section 203, 203', wherein the supplemental sheets 200, 200' are connected to folded sheet 100 by means of said respective attachment section 203, 203' such that said supplemental sheets 200, 200' can be flipped between a first position in which the reverse sides 202, 202' of supple-mental sheets 200, 200' are uncovered and a second position in which the front sides 201, 201' of supplemental sheets 200, 200' are uncovered.

In the preferred embodiment of the sales aid as depicted, the two supplemental sheets 200, 200' are each arranged along an outer edge of folded sheet 100 via an attachment section 203, 203' provided on a lateral edge of the respective supplemental sheet.

Specifically, information field 8 of the front side 101 of folded sheet 100 serves as a cover sheet for the sales aid in the folded state. This information field I8 can contain general information on the service provider. Also conceivable, however, would be printing customer-specific information right on the cover sheet itself (information field 8), such as date of the sales meeting, the customer name or other information.

Information I6, I8 about the customer is printed in information fields 6 and 8 on the front side 101 of folded sheet 100. Conceivable for information field 8 would be the reproducing of a site plan of the customer's company headquarters, for example, or other customer-specific data or even statistics related to the customer. For information field 6, a preferred embodiment provides for this customer-specific data being able to be supplemented by the salesperson during the course of the sales pitch. To enable this, the corresponding blank field can be provided in information field 6.

Figure 2B:
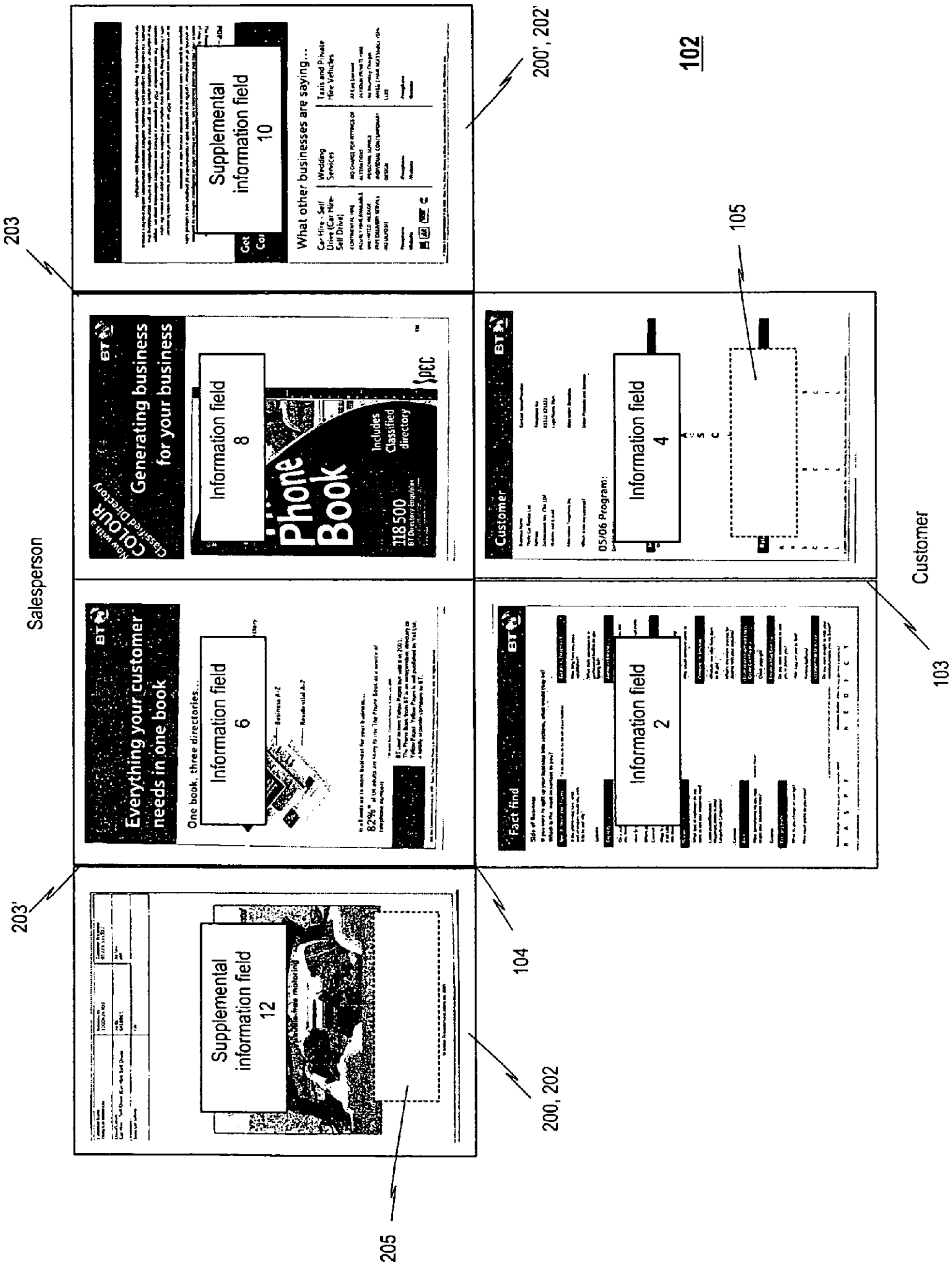

Customer-specific strategies are provided in information field 1 on the reverse side 102 of folded sheet 100 as shown in FIG. 2*b*. This can constitute, for example, statistics illustrating the scope and the extent of the customer's current reach in a specific market sector. Of course, data can also be pre-provided in information field 1 on the reverse side which shows the potential the salesperson or service provider sees for the customer to, for example, increase market share accordingly.

Customer-specific data is also entered in supplemental information field 9 on the reverse side 201' of supplemental sheet 200'. The preferred embodiment illustrated in FIG. 2*b* concerns a customer's website which can be correspondingly modified using the service offered by the salesperson. As an example, the service provider has taken an excerpt from the customer's website to print here which already includes the proposed modifications.

Additional data and statistics can furthermore be included in supplemental information field 3 on the reverse side 201' of supplemental sheet 200' and in information field 1 of the reverse side 102 of folded sheet 100, with an eye to convincing the customer of the necessity of the service offered by the salesperson during the course of the sales pitch.

The status quo state is printed in information field 5 on the reverse side 102 of folded sheet 100. In the present case, this is an excerpt from a telephone directory in which the customer is currently running an ad. Printed in adjacent information field 7 is a revised page of this telephone directory which expands upon the status quo state from information field 5 by the salesperson having previously; i.e., in advance of the current sales pitch, devised a (first) proposal for revising and improving the customer's ad.

The revised and improved mock-up of the customer's ad is depicted separately in supplemental information field 11 on the reverse side 201 of supplemental sheet 200. In addition, at least one recordable memo field 205 is provided in supplemental information field 11 on the reverse side 201 of supplemental sheet 200. Supplemental information field 11 serves to document a joint solution made during the sales meeting with respect to revising the ad.

Supplemental information field 10 on the front side 202' of supplemental sheet 200' (cf. FIG. 2*a*) contains additional suggestions from the salesperson with regard to, for example, text blocks and key words for the customer's ad. This can be, for example, a previously-compiled selection of search terms currently used by the customer's competition which the salesperson then discusses with the customer during the sales pitch as far as their possible incorporation into the revised ad.

Supplemental information field 10 can furthermore be provided with a memo field containing printed items of information, wherein the reading direction to the items of information printed in said memo field reflects an orientation turned 180° relative the reading direction of the front side 101 and the reverse side 102 of folded sheet 100. The items of information printed in the memo field serve the salesperson as a type of "cheat sheet," whereby in preparing for the sales pitch, the salesperson noted customer-specific information here in order to introduce same during the sales pitch as needed and thus steer the sales pitch in a specific direction.

These items of information can be generated using a special Analyzer program. Applicable here would be, for example, the Presentation Optimization Program (POP). This type of program consolidates e.g. personal suggestions made by the customer, psychological characteristics of the customer and other customer-specific data and processes it accordingly. This means that the items of information printed in the memo field reflect data which can be extremely useful to the salesperson during the sales pitch in the devising of an optimized and customer-specific solution. The Presentation Optimization Program is described in a patent application filed with the German Patent and Trademark Office by the present applicant on Oct. 20, 2005; reference is hereby made to same.

To summarize briefly, the POP program serves to generate individualized printed products by analyzing target person-relevant data, and does so by drawing on machine learning and the steps of: 1) collecting individualized data; 2) evaluating the individualized data based on a learning classification algorithm as well as generating an evaluation; and 3) producing individualized printed products based on the evaluation. The above-cited patent application of the present applicant details how the manually impractical automated production of individualized printed products in large quantity per target customer, as used in particular in the selling of telephone directory ads, is made possible.

Figure 1B:
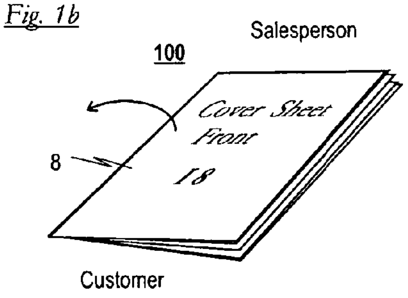

Reference is now made to FIGS. 1*a* through 1*f*. As already indicated, FIGS. 1*a* and 1*b* depict the state prevailing at the beginning of a sales meeting. In this case, the customer is sitting across from the salesperson and the sales aid, in folded state, is positioned between the customer and salesperson.

As stated, the reading direction to the front side (information fields 6, 8) of folded sheet 100 in folded state is oriented relative the customer. Of course, a different arrangement of customer and salesperson is also conceivable.

Figure 1C:
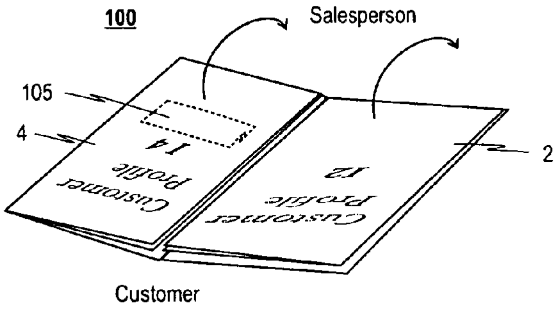

At the start of the sales meeting, the salesperson opens folded sheet 100 in that he or she turns the cover sheet over as if a book. In this state, as shown in FIG. 1*c*, information fields 2 and 4 of front side 101 of folded sheet 100 are flipped open (cf. FIG. 2*a*). As described above, information fields 2 and 4 contain that information I2, I4 on the customer which the salesperson is already aware of, for example from his/her files. This customer profile is of constructive interest to the salesperson and should advantageously be reviewed by the salesperson and customer at the beginning of the conversation and updated as needed. The predefined information I2 and I4 in information fields 2 and 4 can be supplemented manually as need be; for this reason, information field 4 is provided with the corresponding memo field 105. It is of course also conceivable to provide information field 2 with a corresponding memo field.

Figure 1D:
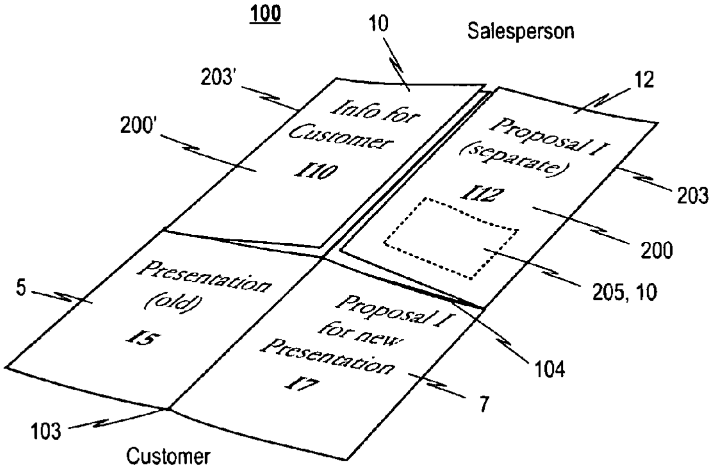

After the customer profile (etc.) has been discussed, the actual sales pitch gets underway. To this end, the salesperson unfolds the folded sheet further so that, as depicted in FIG. 1*d*, the reverse side 102 of folded sheet 100 is now presented to the buyer or customer (cf. FIG. 2*b*). Note that the supplemental sheets 200, 200' disposed at the lateral edges of information fields 1 and 3, 6 and 8 respectively, are hereby in their second positions, such that the front sides 202, 202' of supplemental sheets 200, 200' are uncovered. Also note that in the state depicted in FIG. 1*d*, the reading direction of the uncovered information fields 5 and 7 of folded sheet 100 and the reading direction of the uncovered supplemental information fields 10, 12 of the two supplemental sheets 200, 200' is oriented to the customer.

Also to be noted from FIG. 1*d* is that in the state as depicted; i.e., in which folded sheet 100 is flipped open and in which each supplemental sheet 200, 200' arranged at the lateral edges of folded sheet 100 are in their respective second position, in which the respective front side of the supplemental sheet is revealed, information fields 1 and 3 of the reverse side 102 of folded sheet 100 are covered. In the preferred embodiment as depicted, respective information fields 1 and 3 are covered completely.

In the state of the sales aid as depicted in FIG. 1*d*, the following information fields and supplemental information fields are now aligned to the buyer's direction of reading:

Supplemental information field 10 is at the upper left, oriented to the buyer's reading direction and containing the salesperson's drafts and possible key words for a revised ad for the customer as made in advance. The buyer can peruse the key words and indicate his agreement with same or voice different instructions as the case may be. A memo field is additionally provided in supplemental information field 10, in which the direction of reading for the information printed therein is oriented to the salesperson. As mentioned previously, this memo field serves the salesperson as a "cheat sheet" so that he or she will have important data right at hand during the entire course of the sales pitch.

Information field 5 is at the lower left, and depicts the status quo state of the buyer's ad and is oriented to the buyer's reading direction.

Information field 7 is at the lower right; i.e., adjacent information field 5, and depicts a first proposal from the salesperson as to how, for example, the customer's ad can be optimized.

Supplemental information field 12 is at the upper right and contains the proposed optimized customer ad from information field 7 in a separate layout. Supplemental information field 12 of supplemental sheet 200 further comprises a memo field 205, in which handwritten notes can be made during the sales pitch. For example, it is conceivable that the buyer would be in agreement with the solution proposed by the salesperson apart from a few small changes. These minor changes are then handwritten into supplemental information field 205.

However, should the buyer not accept the optimized proposal depicted in information field 7, the inventive sales aid offers the salesperson the opportunity to present another previously-made proposal to the buyer, by flipping open supplemental sheets 200, 200' into their first position. This state is shown in FIG. 1*e*.

Flipping the two supplemental sheets 200, 200' into their respective first positions uncovers supplemental information field 9 and supplemental information field 11 as printed on the respective reserve sides 201, 201' of supplemental sheets 200, 200'. Information fields 1 and 3 of folded sheet 100 are uncovered at the same time.

Customer-specific statistics or other data can, for example, again be printed in information field 1 of the folded sheet. On the other hand, it would be advantageous to depict a second pre-drafted proposal for an ad in information field 3. This second proposal is now presented to the buyer.

Figure 1E:
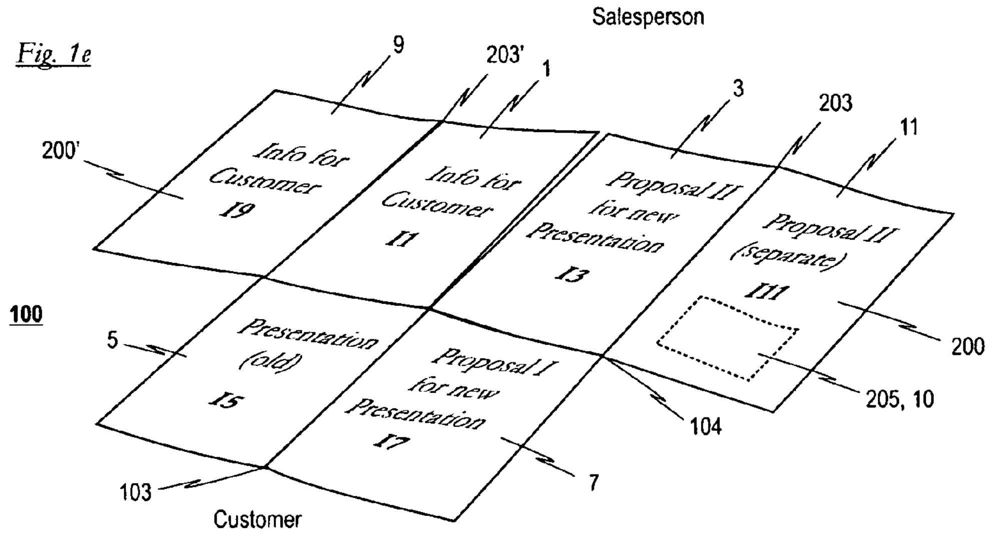
Figure 1F:
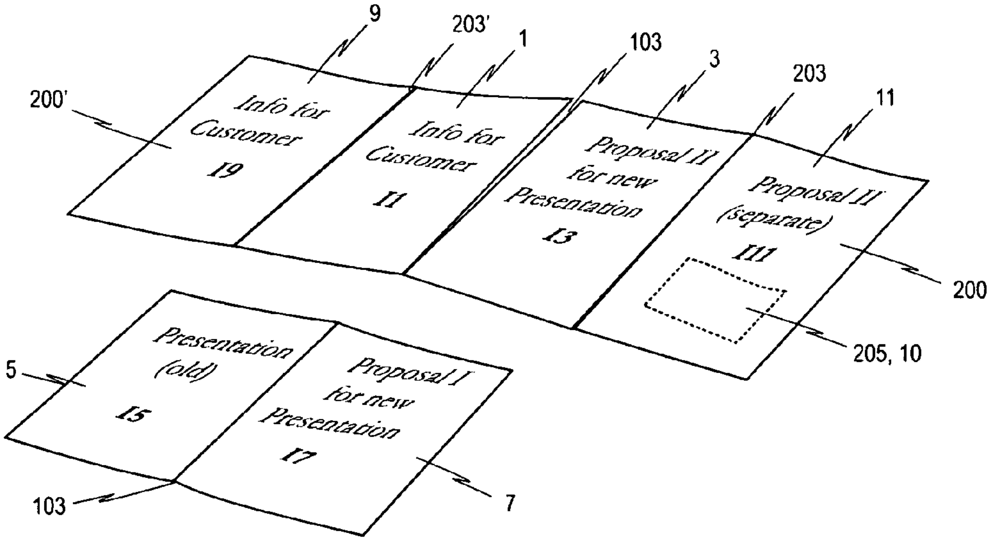

As previously stated, in the state as depicted in FIG. 1*e*, supplemental information field 11 adjacent information field 3 which contains the second proposal from the salesperson is also uncovered. The second proposal is printed separately in supplemental information field 11. A section 205 is likewise provided in supplemental information field 11 for making handwritten remarks and changes.

As the sales meeting draws to its close, the sales aid is separated along the centrically-arranged and foldable section 104 extending transversely to the folded sheet. The lower section of the sale aid is thereby intended for the customer. Same contains all data of interest to the customer. Conversely, the upper part of the sales aid remains with the salesperson and serves as a template for developing the final version of the solution.

From the technical standpoint, it is for example conceivable to digitally print and pre-fold three DIN A2 sheets in the A4 format. The third DIN A2 sheet is affixed to each respective A4 sheet of the two other sheets, whereby this is either effected with an ultra-soft grade of soft tape which can be torn along the adhesion or with an adhesive tape having a reuseable adhesive layer on one side. Using a soft tape which can be separated thus allows the third sheet to be separated for the customer at the end of the sales meeting following its processing. The other two loose sheets—as already indicated—are affixed to the other customer documents and remain with the salesperson.

All customer-specific text and images are advantageously printed on the inner pages of the sales aid. The selling guidelines (POP) are also printed here so as to face the salesperson and remain available despite unfolding. The information fields and supplemental information fields which initially remain covered in the presentation contain an alternative proposal geared to, for example, a smaller budget, and which are only introduced when the first proposal is rejected, for example because of the cost, or when other ads are perhaps to be run in other categories.

The sales aid in accordance with the invention enables an effective and thereby very simple sales process precisely reflective of a salesperson's strategy. In particular, flipping open the supplemental sheets can be used to best advantage with respect to the element of surprise experienced by the customer.

Figure 3:
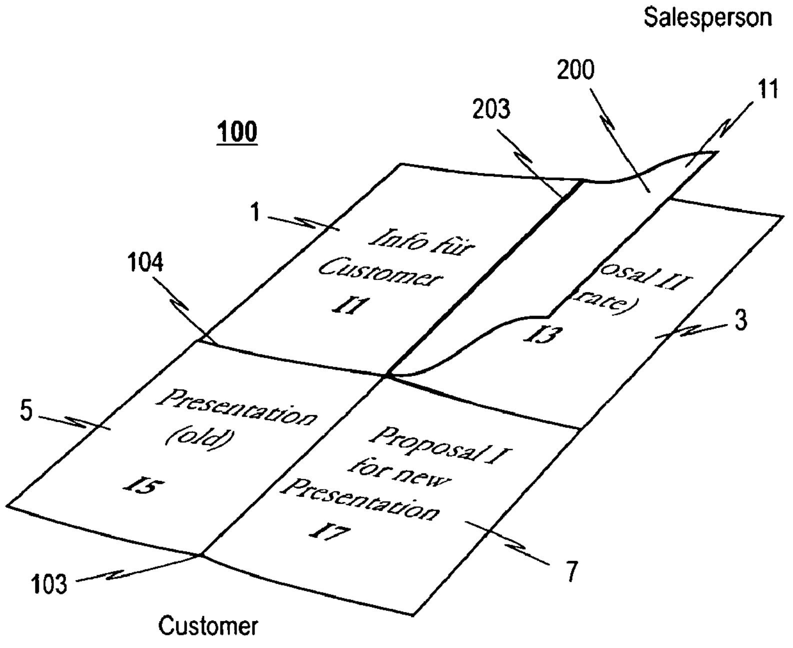
FIG. 3—a perspective view of a further preferred embodiment of the inventive sales aid.

FIG. 3 shows a further embodiment of the sales aid according to the invention. A supplemental sheet 200 is provided in this embodiment which is arranged lengthwise the centrically-arranged foldable section 103 extending longitudinally to folded sheet 100 via an attachment section 203 on the lateral edge of said supplemental sheet in such a way that the supplemental sheet 200 at least partly covers an information field 3 configured on the reverse side of folded sheet 100 in the first position of said supplemental sheet 200, while in the second position of supplemental sheet 200, said supplemental sheet 200 at least partly covers the information field 1 adjacent the information field 3 covered in the first position of the supplemental sheet.

Of course, it is also conceivable for supplemental sheet 200 to be accordingly arranged along the centrically-arranged foldable section 104 extending transversely to folded sheet 100.

Figure 4:
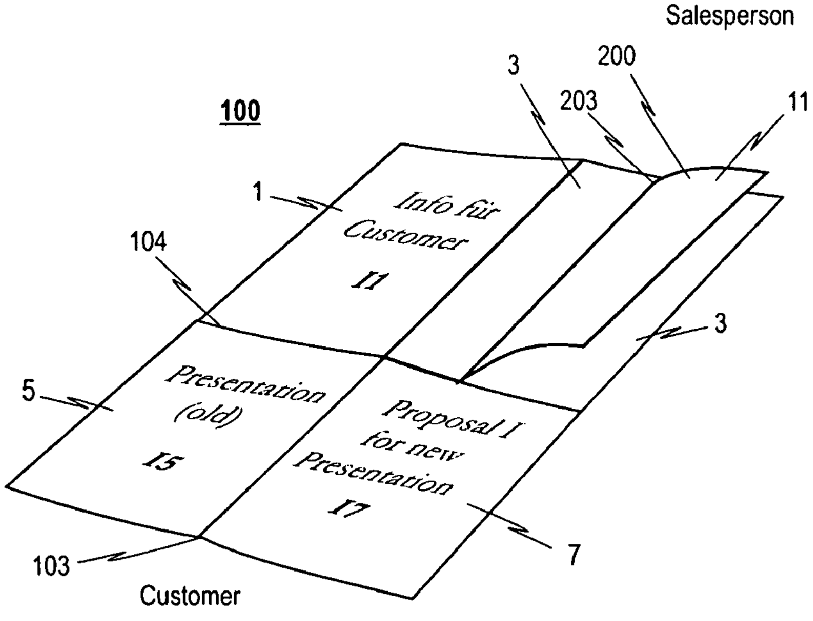
FIG. 4—a perspective view of a further preferred embodiment of the inventive sales aid.

FIG. 4 shows another further preferred embodiment of the sales aid according to the invention. It is hereto provided that the lateral edge of supplemental sheet 200 having the at least one attachment section 203 is disposed at an information field 3 configured on the reverse side of the folded sheet parallel to the centrically-arranged foldable section 103 extending longitudinally to folded sheet 100 such that in the first position of supplemental sheet 200, a first partial section of the information field 3 configured on the reverse side of folded sheet 100 is covered by supplemental sheet 200, while in the second position of supplemental sheet 200, a second partial section of information field 3 is covered by supplemental sheet 200.

It is of course conceivable here as well for supplemental sheet 200 to not be arranged parallel to the centrically-arranged foldable section 103 extending longitudinally to folded sheet 100, but rather parallel to the centrically-arranged foldable section 104 extending transversely to folded sheet 100.

It is furthermore conceivable to dispose a carbonless transfer paper on at least one information field or supplemental information field of the inventive sales aid.

In the memo field configured as a "cheat sheet," an exact line of action is indicated as developed by a software program using the previously-entered profile figures. Drawing on SII rules, the publisher previously defined an optimizing of the sales process and same leads the salesperson through the sales negotiations here.

The supplemental sheets deliberately cover up other pages of text containing other additional products/services offered by the publisher. This can include other additional ad sizes/styles as well as services unrelated to print such as internet directories or internet-specific offers including web design. This offer page should therefore remain covered because it should first be clarified during the previously-described sales pitch related to pages 2-3 whether there is even any interest at all in such services/products. (Should this not be the case, it would be far better to keep this page covered rather than "irritate" the customer with additional offers.)

The following will specify another advantageous embodiment of the sales aid according to the invention by making reference to FIGS. 5 and 6. In this example, the service provider offers layout and design of printed media advertisements to a customer. This example serves only to illustrate the inventive sales aid and should not in any way be construed as being limiting. Of course, the sales aid is not applicable solely to the promoting of services, but also merchandise.

The sales aid in accordance with the invention is a printed folded sheet 100, whereby specific information I2, I4, I6, I8 and I1, I3, I5, I7 is printed in each of four different information fields 2, 4, 6, 8 and 1, 3, 5, 7 on the front side 101 (see FIG. 2*a*) and on the reverse side 102 (see FIG. 2*b*) respectively. Some of these items of information are customer-specific information or can also be information about the service provider. Moreover, at least one supplemental sheet 200 configured as an insert sheet is disposed at one lateral edge to form further information fields 9, 10. In the embodiment as represented, the supplemental sheet 200 configured as an insert sheet (hereinafter referred to as "insert sheet") is attached in hinged fashion to the outer edge of information field 2 or 3 respectively. It is of course conceivable for a plurality of insert sheets or supplemental sheets to be disposed at other locations on the folded sheet, above one another as the case may be, so that the information I9 and I10 printed on the insert sheets can be presented in the form of a "flip-book show." The covered position of insert sheet 200 is shown in FIG. 5*c* and the uncovered position is shown for example in FIGS. 5*e*, 5*f* and 6*a*, 6*b*.

Specifically, information field 4 of front side 101 of folded sheet 100 serves as a cover sheet for the sales aid when in folded state. This information field 4 can contain general information on the service provider. Also conceivable, however, would be printing customer-specific information right on the cover sheet itself (information field 4), such as the date of the sales meeting or the name of the customer.

Information about the customer or marketing information is printed in information fields 6 and 8 on the front side 101 of folded sheet 100 and in the supplemental information field 12 of insert sheet 200. Conceivable for information field 8 would be the reproducing of a site plan of the customer's company headquarters, for example, or other customer-specific data or statistics. For information field 6, a preferred embodiment provides for this customer-specific data being able to be supplemented by the salesperson during the course of the sales pitch. To this end, the corresponding blank field can be provided in information field 6.

Information field 2 on the front side 101 of folded sheet 100 can be configured as a memo field. In the embodiment depicted, however, it is information field 11 on the reverse side of insert sheet 200 which is configured as such a memo field. A customer-specific solution is worked out in this memo field during the course of the sales meeting.

Figure 5C:
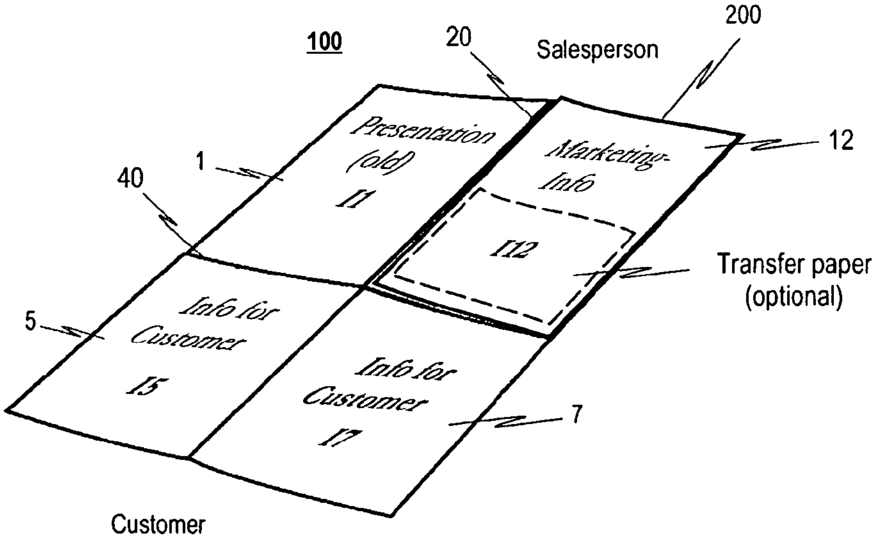
Figure 6A:
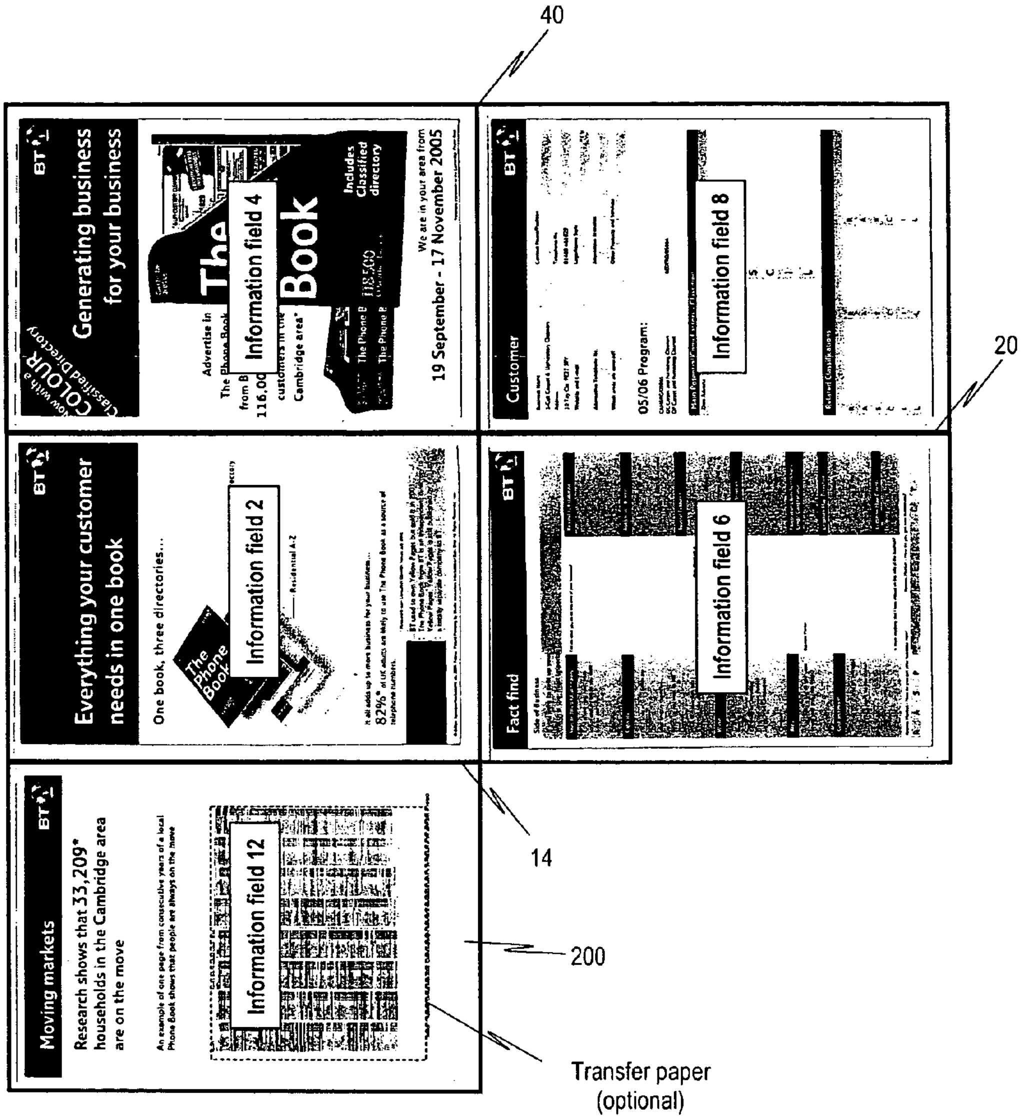
FIGS. 6*a, b*—the front and reverse side of the inventive sales aid in accordance with FIGS. 5*a-h*.
Figure 6B:
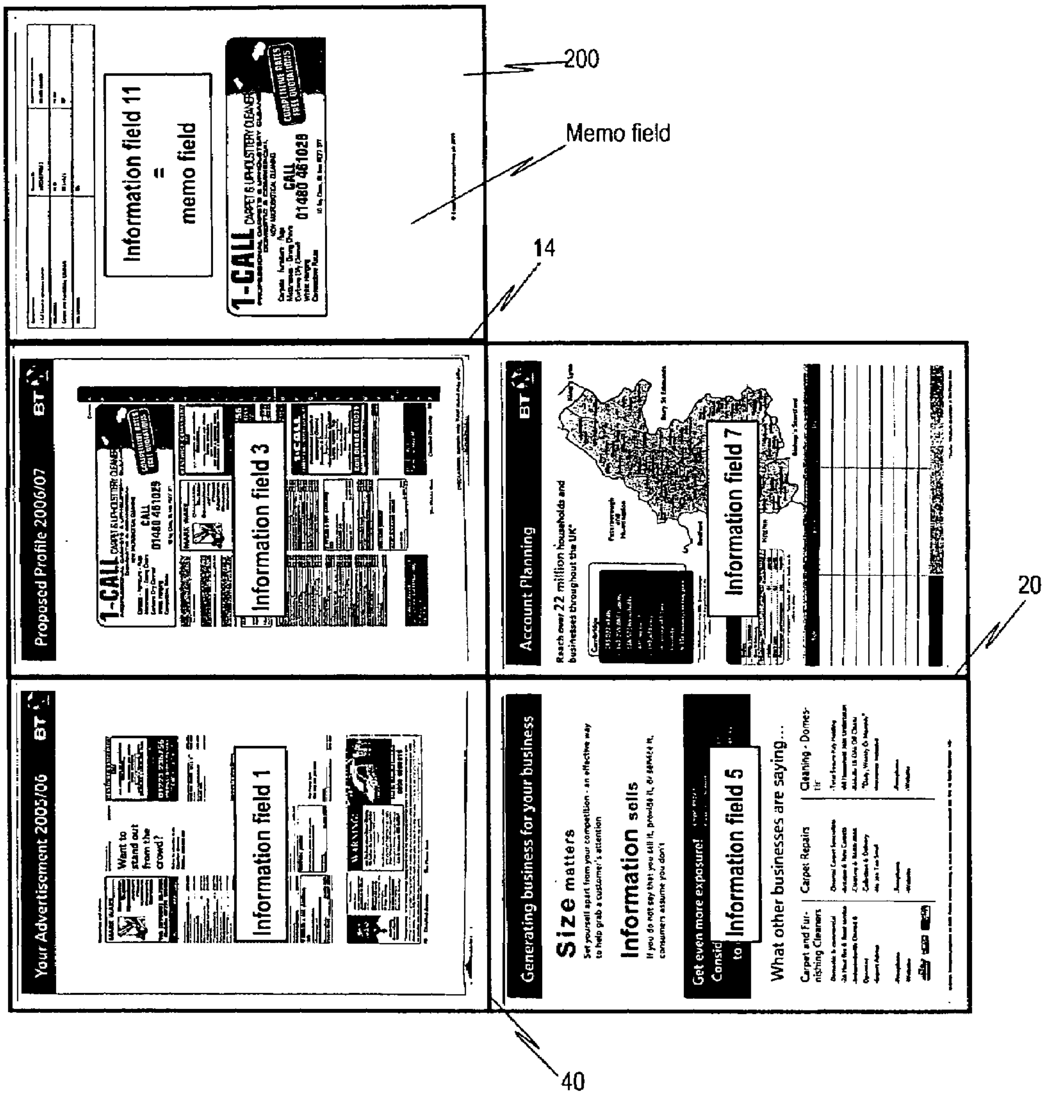

The status quo state is printed in information field 1 on the reverse side 102 of folded sheet 100 shown in FIG. 6*b*. In the present case, this is an excerpt from a telephone directory in which the customer is currently running an ad. Printed in adjacent information field 3 is a revised page of this telephone directory which expands upon the status quo state from information field 1 by the salesperson having previously; i.e., in advance of the current sales pitch, devised a proposal for revising and improving the customer's ad. This information field 1 is covered by insert sheet 200 in the covering position of insert sheet 200 (cf. FIG. 5*c*) so that the information field 12 of the insert sheet is visible to the buyer. As mentioned, marketing information, for example, is printed in information field 12.

Information field 5 contains printed information about the salesperson or service provider which is intended for the customer and which serves to provide the customer with a quick overview of the strategy and the success of the proposed service. A further memo field can optionally be provided in information field 7, which can be configured analogously to information field 2 of the front side 10 of folded sheet 100. It would be conceivable to detachably affix a carbonless transfer paper 30, advantageously a 3M "Action" paper, to this memo field.

Figure 5A:
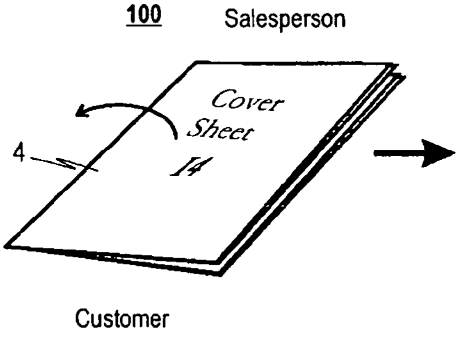
FIGS. 5*a-h*—a course of possible application of a further preferred embodiment of the inventive sales aid in selling ads for a print medium.

The front side 101 of folded sheet 100 shown in FIG. 6*a* and the reverse side 102 of folded sheet 100 depicted in FIG. 6*b* can be positioned with respect to one another such that in the folded state of the folded sheet, information field 2 with the memo field configured therein overlies information field 7 having its own memo field. The folded state of the folded sheet is depicted in FIG. 5*a*.

Reference is now made to FIGS. 5*a* through 5*h*. As previously indicated above, FIG. 1*a* depicts the state prevailing at the beginning of a sales meeting. In this case, the customer is sitting across from the salesperson and the sales aid, folded sheet 100 respectively, is positioned in folded state between the customer and salesperson.

As FIG. 5*a* indicates, the reading direction to the front side 101 (information field 4) of folded sheet 100 in folded state is oriented relative the customer. Of course, a different arrangement of customer and salesperson is also conceivable.

Figure 5B:
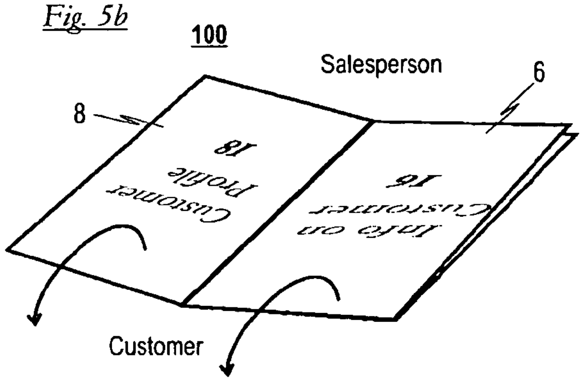

At the start of the sales meeting, the salesperson opens folded sheet 100 in that he or she turns the cover sheet over as if a book. In this state, as shown in FIG. 5*b*, information fields 6 and 8 are flipped open (cf. FIG. 6*a*). As described above, information fields 6 and 8 contain that information on the customer which the salesperson is already aware of, for example from his or her files. This customer profile is of constructive interest to the salesperson and should advantageously be reviewed by the salesperson and customer at the beginning of the conversation and updated as needed. For this reason, the predefined information I6 and I8 in information fields 6 and 8 can be supplemented with handwritten inscriptions as need be.

After the customer profile, etc. has been discussed, the actual sales pitch gets underway. To this end, the salesperson unfolds the folded sheet further so that, as depicted in FIG. 1*c*, the reverse side 102 of folded sheet 100 is now presented to the buyer or customer (cf. FIG. 6*b*). Note that the reading direction to information fields 1, 3, 5 and 7 is oriented to the customer. This is depicted in FIG. 5*c*. The figure further reveals that the buyer is now presented with insert sheet 200 in its covering position. Information field 3 of the folded sheet is thus concealed from the buyer or customer while information field 12 of insert sheet 200 is presented instead. As information I12, this information sheet can contain, for example, printed marketing information.

Figure 5D:
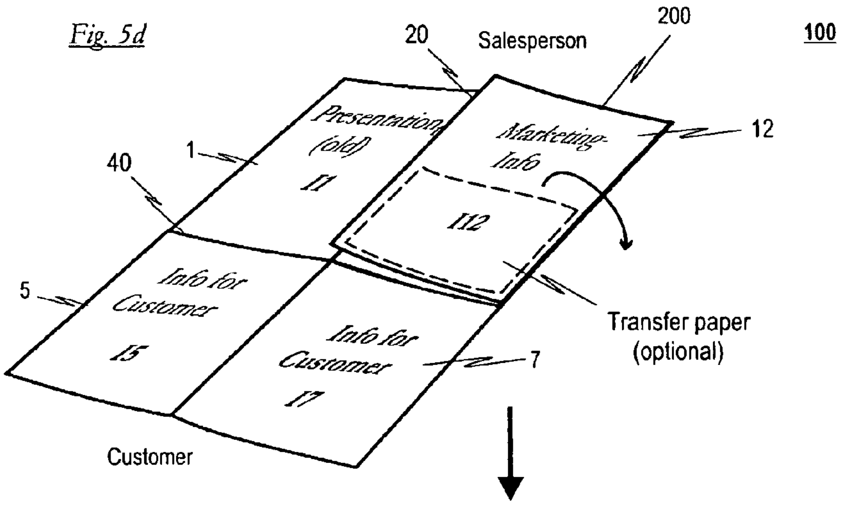

Next, the salesperson unfolds the insert sheet along edge 14 (FIG. 5*d*). In other words, this means that insert sheet 200 is turned like a page in a book. The unfolded position of the insert sheet is depicted in FIG. 5*e*.

The buyer is now presented with the previously hidden information field 3 of folded sheet 100. As previously indicated, developing the status quo state further from the information I3 printed in information field 3, a revised page of the telephone directory is displayed in which the salesperson has previously developed a proposal for a revised and improved layout to the customer's ad. This information I3 is presented to the customer at the end of the sales pitch, for example after the customer has been informed about the advantages and the background to the offered service based on the information as presented to that point.

As previously indicated, the advantageous embodiment depicts the status quo state of the customer's advertisement in the telephone directory as pre-defined information I1 in information field 1. A proposal from the salesperson as an appropriate revision of the customer's ad is printed as pre-defined information I3 in adjacent information field 3. Based on this presentation and on the direct comparison between the status quo state (information field 1) and a feasible proposed revision (information field 3), the customer can immediately recognize the impact and the advantage of availing himself of the salesperson's service, the revision of his advertisement respectively.

Figure 5E:
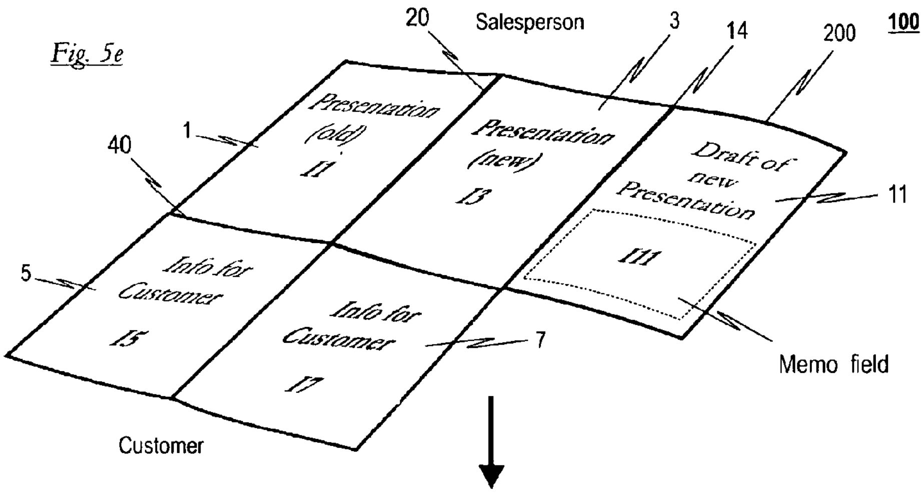
Figure 5F:
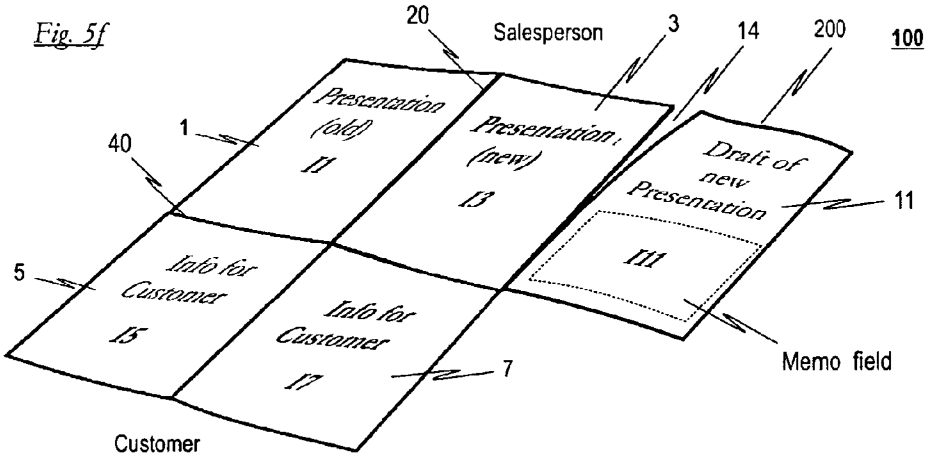
Figure 5G:
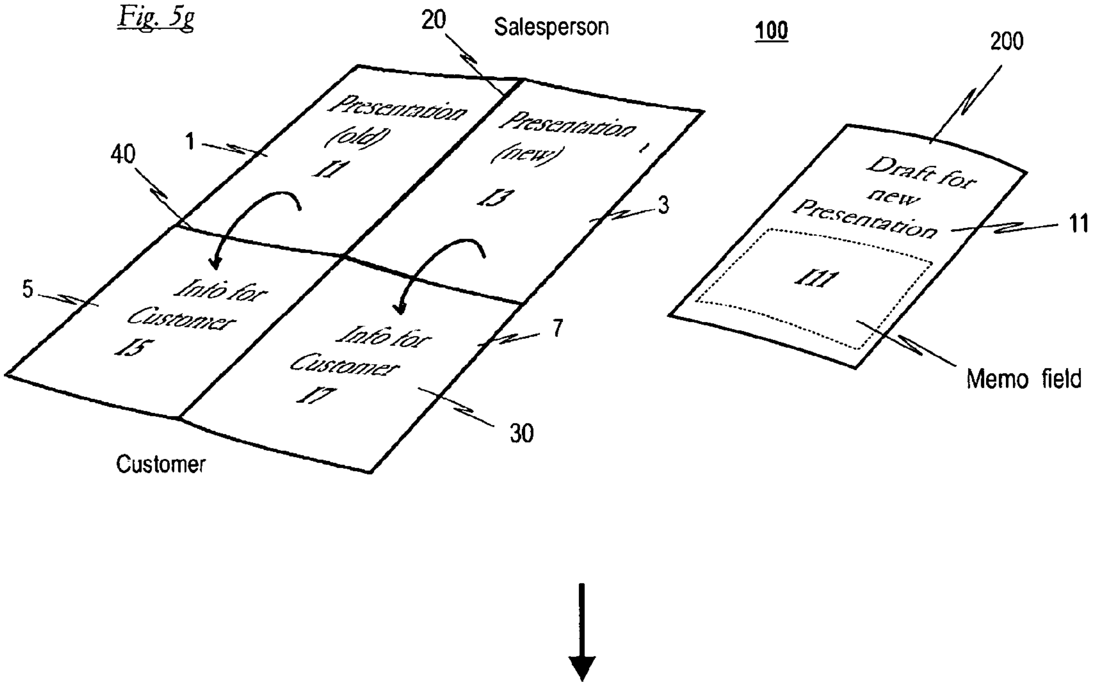
Figure 5H:
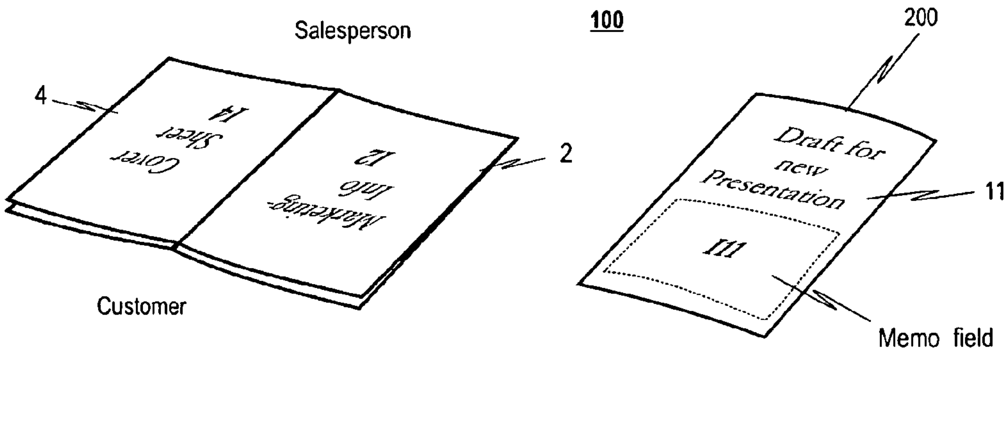

As can also be seen from FIG. 5*e*, the reverse side of insert sheet 200 is now revealed in the unfolded position of said insert sheet 200. Information field 11 is provided on the reverse side of insert sheet 200, configured here as a memo field. Modifications and supplemental wishes of the customer are entered into this memo field as follows from the direct comparison between the status quo state (information field 1) and the feasible proposed revision (information field 3). Since the (handwritten) information entered in the memo field during the sales meeting serves as the starting-point information for the revising or processing of the advertisement, insert sheet 200 is detachably affixed to folded sheet 100. After information field 11, memo field respectively, of insert sheet 200 having been filled out during the course of the conversation, insert sheet 200 is separated from folded sheet 100. To this end, fold 14 is detachable affixed. FIG. 5*f* shows the separating of insert sheet 200 from folded sheet 100.

So that there will be multiple copies of the information entered into the memo field provided for the purpose on insert sheet 200 during the sales meeting (for both the customer and the salesperson, for example), without having to photocopy the insert sheet, a further transfer paper can optionally be disposed on the reverse side of the memo field so that additional information handwritten into the memo field can be transferred directly by means of said transfer paper to an additionally provided duplicate memo field. FIG. 5*d*, for example, indicates the optionally provided transfer paper on information field 12 of insert sheet 12.

Basic data from the salesperson or service provider is advantageously printed in information field 5, which is likewise depicted in FIGS. 5*d* and 5*e* in the state in which it is also presented to the customer. In the present case, statistics relevant to the commercial sectors addressed are entered into the revision of the customer's advertisement depicted in information field 3. Of course, it is also conceivable here to provide additional or other information in information field 5.

In the state depicted in FIG. 5*e*, all the information important to the customer, as previously drafted by the salesperson, is available during the sales pitch as one package. Using this information as a basis, it then becomes possible to arrive at a customer-specific solution. This is especially necessary when the salesperson's proposal depicted in information field 3 only meets with conditional customer agreement.

It is further advantageously provided to transparently print the customer's previous ad represented in information field 1 or the proposed new (revised) customer ad depicted in information field 3 in information field 11. This serves to orientate and simplify the applying of the customer's desired changes. For example, it would be sufficient to simply draw an arrow to move the user's logo from the position it has previously been in to its new position in the proposed, new advertisement.

After the customer-specific solution has been entered and noted in information field 11 of insert sheet 200, the salesperson separates insert sheet 200 from folded sheet 100 along fold 14 which is advantageously configured as a perforation or as a special adhesive tape.

The first part of the now separated sales aid encompasses folded sheet 100 with information fields 1, 3, 5 and 7 of reverse side 100 and information fields 2, 4, 6 and 8 of front side 10. This first part of the sales aid is intended for the customer since it contains all the information of interest to said customer.

The second part of the separated sales aid encompasses insert sheet 200 comprising information fields 11 and 12 and is intended for the salesperson. In particular, the solution worked out during the meeting with the customer is documented in information field 11. As indicated above, a copy of the solution drafted in information field 11 during the sales pitch can also be given to the customer when using an optionally provided carbonless transfer paper.

As is the case with fold 14, the centrically-arranged transverse fold of the folded sheet is likewise advantageously configured as a perforation or using a special adhesive tape. The folded sheet can thus be separated into an upper and a lower half, wherein the lower half of the separated folded sheet is in particular intended for the salesperson, and wherein the upper half with the marketing information is intended for the customer. As previously described, information field 11 of the lower half of folded sheet 1 separated as such contains the updated and discussed customer data (customer profile). This information is of interest to the salesperson.

It would be further conceivable to have another memo field in the form of a sheet under transfer paper 30 disposed on information field 7 of reverse side 100 of folded sheet 1, which contains, for example, additional or supplemental services of the service provider or salesperson which can be discussed and arranged with the customer.

Optional carbonless transfer paper is advantageously affixed in detachable fashion to information field 12 on the reverse side of insert sheet 200 by means of an adhesive strip. It is conceivable hereto for the transfer paper to exhibit notched areas to facilitate the removing of the transfer paper from information field 12 on the reverse side of insert sheet 200. Advantageously, these notched areas do not exhibit adhesive strips.

It is also conceivable for the transfer paper to not be completely affixed on all four peripheral edges to information field 12, but rather have one side open so that a pocket of sorts is formed into which, for example, the customer's business card or other handouts given to the salesperson during the sales meeting can be placed.

The separated insert sheet 200 intended for the salesperson can now be folded such that the service provider sales rep can send it directly by mail to the service provider's main office for further processing or developing. It would also be conceivable to print the service provider's address in advance in information field 11 or 12 and to fold the lower part of the separated folded sheet into an envelope, whereby the information printed in information field 11 or 12 forms the exterior of the envelope.

To summarize, the distinctive feature of the sales aid is the extremely user-friendly folding, which provides text addressed to the salesperson and text addressed to the customer respectively. The other features of use including the option of concealing pages, making copies by means of a carbonless transfer paper, etc., serve in optimizing the presentation process.

What is claimed is:

1. Sales aid in the form of a printed folded sheet, wherein a) the front side and the reverse side of the folded sheet are printed with pre-determined information;

b) the folded sheet exhibits a centrically-arranged foldable section extending longitudinally to the folded sheet and a centrically-arranged foldable section extending transversely to the folded sheet, wherein four information fields each are configured on the front side and the reverse side of the folded sheet;

c) a pre-determined item of information is printed in each information field, whereby the reading direction to the front side and to the reverse side is in each case of the same orientation; and d) the sales aid further comprises at least one supplemental sheet, the front side and reverse side of which are configured with supplemental information fields which can be printed with supplemental information, wherein the at least one supplemental sheet is connected to the folded sheet such that said supplemental sheet can be folded open between a first position, in which the reverse side of the supplemental sheet is uncovered, and a second position in which the front side of the supplemental sheet is uncovered.

2. Sales aid in accordance with claim 1, wherein the at least one supplemental sheet is affixed to a lateral edge in such a manner that the supplemental sheet can be moved or flipped from a covering position, in which said sheet at least partly covers one of the information fields of the folded sheet into an unfolded position in which said sheet reveals said one information field.

3. Sales aid in accordance with claim 1, wherein the supplemental sheet exhibits a lateral edge having at least one attachment section, wherein said supplemental sheet is connected to the folded sheet by means of the respective attachment section such that said supplemental sheet can be folded between a first position, in which the reverse side of the supplemental sheet is uncovered, and a second position in which the front side of the supplemental sheet is uncovered, and wherein the lateral edge of the at least one supplemental sheet exhibiting the at least one attachment section is arranged lengthwise the centrically-arranged foldable section extending longitudinally to the folded sheet.

4. Sales aid in accordance with claim 3, wherein the supplemental sheet is disposed by means of attachment section provided on the lateral edge of the supplemental sheet lengthwise the centrically-arranged foldable section extending longitudinally to the folded sheet such that an information field configured on the reverse side or the front side of the folded sheet is at least partly covered by said supplemental sheet in the first position of the supplemental sheet while in the second position of supplemental sheet, the information field adjacent the information field covered in the first position is at least partly covered by said supplemental sheet.

5. Sales aid according claim 1, wherein the supplemental sheet exhibits a lateral edge having at least one attachment section, wherein said supplemental sheet is connected by means of the respective attachment section to the folded sheet such that said supplemental sheet can be folded open between a first position, in which the reverse side of the supplemental sheet is uncovered, and a second position in which the front side of the supplemental sheet is uncovered, and wherein the lateral edge of the supplemental sheet exhibiting the at least one attachment section is disposed lengthwise the centrically-arranged foldable section extending transversely to the folded sheet.

6. Sales aid in accordance with claim 5, wherein the supplemental sheet is disposed by means of attachment section provided on the lateral edge of said supplemental sheet along the centrically-arranged, transversely-extending foldable section of the folded sheet such that an information field configured on the reverse side or the front side of the folded sheet is at least partly covered by the supplemental sheet in the first position of said supplemental sheet while in the second position of the supplemental sheet, the information field below or above the information field covered in the first position is at least partly covered by said supplemental sheet.

7. Sales aid according to claim 1, wherein the supplemental sheet exhibits a lateral edge having at least one attachment section, wherein said supplemental sheet is connected to the folded sheet by means of the respective attachment section such that said supplemental sheet can be folded open between a first position, in which the reverse side of the supplemental sheet is uncovered, and a second position in which the front side of the supplemental sheet is uncovered, and wherein the lateral edge of the supplemental sheet exhibiting the at least one attachment section is arranged at one of the information fields configured on the front side or the reverse side of the folded sheet parallel to the centrically-arranged and longitudinally-extending foldable section or parallel to the centrically-arranged and transversely-extending foldable section of the folded sheet such that a first partial section of an information field configured on the front side or the reverse side of the folded sheet is covered by the supplemental sheet in the first position of said supplemental sheet while in the second position of the supplemental sheet, a second partial section of the one information field is covered by said supplemental sheet.

8. Sales aid according to claim 1, wherein the supplemental sheet exhibits a lateral edge having at least one attachment section, wherein said supplemental sheet is connected to the folded sheet by means of the respective attachment section such that said supplemental sheet can be folded open between a first position, in which the reverse side of the supplemental sheet is uncovered, and a second position in which the front side of the supplemental sheet is uncovered, and wherein the lateral edge of the supplemental sheet exhibiting the at least one attachment section is arranged at least partially lengthwise an outer edge of the folded sheet.

9. Sales aid in accordance with claim 8, wherein the supplemental sheet is arranged by means of attachment section provided at the lateral edge of said supplemental sheet lengthwise an outer edge of the folded sheet such that an information field configured on the reverse side or the front side of the folded sheet is at least partly covered in the first position of the supplemental sheet while none of the information fields configured on the folded sheet are covered by the supplemental sheet in the second position of said supplemental sheet.

10. Sales aid in accordance with claim 8, wherein at least two supplemental sheets are provided, wherein the two outer edges of the folded sheet, on which the attachment sections provided on the respective lateral edges of the two supplemental sheets are arranged, lie opposite one another.

11. Sales aid in accordance with claim 10, wherein the centrically-arranged, longitudinally-extending foldable section, extending between the two information fields configured on the front side or the reverse side of the folded sheet, with one of the two supplemental sheets respectively arranged at their respective outer edges, is configured as a notching.

12. Sales aid according to claim 1, wherein the front side and/or the reverse side of the at least one supplemental sheet can be printed with pre-determined supplemental information, wherein the direction of reading to the front side and the reverse side of the supplemental sheet in each case corresponds to the reading direction of the front side and the reverse side of the folded sheet.

13. Sales aid according to claim 1, wherein the at least one supplemental sheet is detachably affixed to a lateral edge of an information field of the folded sheet, wherein a transverse fold is configured lengthwise the lateral edge of said one information field to which the at least one supplemental sheet is attached.

14. Sales aid according to claim 1, wherein the transverse fold disposed at the one lateral edge of the one information field and/or the foldable section arranged centrically and transversely to the folded sheet is formed by means of an adhesive strip.

15. Sales aid according to claim 1, wherein a transfer paper is detachably affixed to at least one of the information fields of the folded sheet and/or to at least one of the supplemental information fields of the at least one supplemental sheet.

16. Sales aid according to claim 1, wherein at least two information fields of the information fields of the folded sheet and/or the supplemental information fields of the least one supplemental sheet is configured as a memo field in which subsequent inscriptions can be entered, wherein one memo field in each case in one information field of the front side of the folded sheet and/or in one supplemental information field of the front side of the least one supplemental sheet and in one information field of the reverse side of the folded sheet and/or in one supplemental information field of the reverse side of the least one supplemental sheet is respectively disposed so as to lie atop one another in the folded state of folded sheet.

17. Sales aid in accordance with claim 16, wherein the information field of the reverse side of the folded sheet and/or the supplemental information field of the reverse side of the supplemental sheet, to which a transfer paper is detachably affixed, is configured as a memo field.

18. Sales aid according to claim 1, wherein at least one supplemental information field of the at least one supplemental sheet is configured as a memo field into which subsequent inscriptions can be entered.

19. Sales aid in accordance with claim 18, wherein a transfer paper is detachably affixed to the reverse side of the supplemental information field of the at least one supplemental sheet configured as a memo field.

20. Sales aid according to claim 16, wherein each memo field contains transparently printed items of information.

21. Sales aid in accordance with claim 20, wherein the transparently printed items of information on the at least two information fields or supplemental information fields are identical to the items of information in the information fields of the folded sheet and/or the supplemental information fields of the supplemental sheet.

22. Sales aid in accordance with claim 20, wherein the reading direction to the transparently printed items of information in the memo field of the front side of the folded sheet exhibit the same orientation as the reading direction of the items of information printed in the other information fields on the front side of the folded sheet.

23. Sales aid according to claim 1, wherein a transfer paper is affixed to one of the information fields of reverse side of the folded sheet and/or to one of the supplemental information fields of the supplemental sheet by means of adhesive strips, whereby the outer edge of said transfer paper adjoining the outer edge of the longitudinal side of the folded sheet the supplemental sheet respectively, is affixed using a continuous strip of adhesive, and wherein the edges of the transverse side of the folded sheet or the supplemental sheet adjoining the outer edge of the transfer paper is affixed with non-continuous adhesive strips.

24. Sales aid according to claim 1, wherein a transfer paper is affixed to one of the information fields of the reverse side of the folded sheet and/or to one of the supplemental information fields of the supplemental sheet by means of adhesive strips and that said transfer paper exhibits notched areas at its outer edges which do not serve in the affixing of the transfer paper to the information field.

25. Sales aid according to claim 1, wherein a transfer paper is detachably affixed to one of the information fields of the reverse side of the folded sheet and/or to one of the supplemental information fields of the supplemental sheet by means of adhesive strips so as to form a pocket.

26. Sales aid according to claim 1, wherein at least one information field of the information fields of the folded sheet and/or the supplemental information fields of the at least one supplemental sheet is configured as a memo field in which subsequent inscriptions can be entered, wherein a plurality of dots are printed on the memo field in a specific dot pattern such that the position of each dot represents an explicit coordinate on the memo field.

27. Sales aid in accordance with claim 26, wherein the subsequently inscribed entries are made in the memo field using a recorder device, wherein a reader device is further provided in said recorder device which reads at least part of the transparent dot pattern printed on the memo field during the entering of the subsequent inscription in the memo field and recognizes the inscription entered on the basis of the dots as read.

28. Sales aid in accordance with claim 27, wherein said recorder device additionally comprises a communication device to transmit the entered inscription detected on the basis of the dots as read to an external device in digital form.

* * * * *

UNITED STATES PATENT AND TRADEMARK OFFICE

CERTIFICATE OF CORRECTION

PATENT NO. : 7,591,423 B2
APPLICATION NO. : 11/341883
DATED : September 22, 2009
INVENTOR(S) : Hallbauer et al.

It is certified that error appears in the above-identified patent and that said Letters Patent is hereby corrected as shown below:

On the title page, under Foreign Application Priority Data (Item 30), change "20 2005 013 307 U" to --20 2005 013 307--.

At column 7, lines 37-38, change "for-example," to --for example,--.

At column 24, line 37, in Claim 16, before "least" insert --at--.

At column 25, line 4, in Claim 23, change "sheet" to --sheet,--.

Signed and Sealed this

Twenty-third Day of February, 2010

David J. Kappos
*Director of the United States Patent and Trademark Office*

UNITED STATES PATENT AND TRADEMARK OFFICE

CERTIFICATE OF CORRECTION

PATENT NO. : 7,591,423 B2
APPLICATION NO. : 11/341883
DATED : September 22, 2009
INVENTOR(S) : Hallbauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this

Twenty-first Day of September, 2010

David J. Kappos

*Director of the United States Patent and Trademark Office*